(12) United States Patent
Kanemura et al.

(10) Patent No.: US 9,175,197 B2
(45) Date of Patent: Nov. 3, 2015

(54) PRESSURE-SENSITIVE ADHESIVE COMPOSITION FOR OPTICAL FILMS AND PRESSURE-SENSITIVE ADHESION TYPE OPTICAL FILM

(75) Inventors: Hideaki Kanemura, Tsukuba (JP); Yoshihiro Morishita, Tsukuba (JP); Shinya Oshita, Tsukuba (JP); Masahiko Kawasaki, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 135 days.

(21) Appl. No.: 13/701,601

(22) PCT Filed: Jun. 3, 2011

(86) PCT No.: PCT/JP2011/062764
§ 371 (c)(1),
(2), (4) Date: Dec. 3, 2012

(87) PCT Pub. No.: WO2011/152514
PCT Pub. Date: Dec. 8, 2011

(65) Prior Publication Data
US 2013/0079468 A1    Mar. 28, 2013

(30) Foreign Application Priority Data
Jun. 4, 2010 (JP) ................................ 2010-128932

(51) Int. Cl.
| | | |
|---|---|---|
| C09J 153/00 | (2006.01) | |
| C08F 297/02 | (2006.01) | |
| C09J 7/02 | (2006.01) | |
| G02B 1/10 | (2015.01) | |
| G02B 5/30 | (2006.01) | |

(52) U.S. Cl.
CPC ........... *C09J 153/00* (2013.01); *C08F 297/026* (2013.01); *C09J 7/0221* (2013.01); *C09J 7/0246* (2013.01); *C08L 2205/02* (2013.01); *C09J 2201/622* (2013.01); *C09J 2203/318* (2013.01); *C09J 2453/00* (2013.01); *G02B 1/105* (2013.01); *G02B 5/3033* (2013.01)

(58) Field of Classification Search
USPC ....................................................... 525/89
See application file for complete search history.

(56) References Cited

U.S. PATENT DOCUMENTS

| | | | |
|---|---|---|---|
| 5,264,527 A | 11/1993 | Varshney et al. | |
| 6,329,480 B1 | 12/2001 | Uchiumi et al. | |
| 7,255,920 B2 | 8/2007 | Everaerts et al. | |
| 2005/0182182 A1 | 8/2005 | Morishita et al. | |
| 2009/0305068 A1 * | 12/2009 | Morishita et al. | 428/483 |
| 2011/0135921 A1 * | 6/2011 | Tse et al. | 428/355 AC |
| 2011/0230609 A1 * | 9/2011 | Oshita et al. | 524/197 |

FOREIGN PATENT DOCUMENTS

| | | |
|---|---|---|
| CN | 102307964 A | 1/2012 |
| JP | 6-93060 A | 4/1994 |
| JP | 7-25859 B2 | 3/1995 |
| JP | 11-323072 A | 11/1999 |
| JP | 11-335432 A | 12/1999 |
| JP | 2003-266613 A | 9/2003 |
| JP | 2004-2736 A | 1/2004 |
| JP | 2005-307063 A | 11/2005 |
| JP | 2008-508394 A | 3/2008 |
| JP | 2010-18796 A | 1/2010 |
| JP | 2010-106230 A | 5/2010 |
| WO | WO 2008/065982 A1 | 6/2008 |
| WO | WO 2010064551 * | 6/2010 |

OTHER PUBLICATIONS

Hamada, electronic translation of specifcation of JP 2005-307063, Nov. 2005.*
Office Action issued on Jan. 24, 2014 in the corresponding Chinese patent Application No. 201180027495.1.
International Search Report Issued Aug. 9, 2011 in PCT/JP2011/062764.
Georges Moineau et al., "Synthesis of fully acrylic thermoplastic elastomers by atom transfer radical polymerization (ATRP), $2^a$ Effect of the catalyst on the molecular control and the rheological properties of the triblock copolymers", Macromol. Chem. Phys., vol. 201, 2000, pp. 1108-1114.
European Search Report issued on Feb. 25, 2015 in corresponding EP patent application No. 11789915.3, 4 pp.
Nakamura, Yohinobu: "Effects of compatibility of acrylic block copolymer and tackifier of phase structure and peel adhesion of their blend" Journal of Adhesion Science and Technology, Jan. 1, 2008, pp. 1313-1331, XP009182531.

* cited by examiner

*Primary Examiner* — Jeffrey Mullis
(74) *Attorney, Agent, or Firm* — Oblon, McClelland, Maier & Neustadt, L.L.P.

(57) ABSTRACT

There is provided a pressure-sensitive adhesive composition for optical films, which is excellent in heat resistance, weathering resistance and bleed resistance, which has an excellent balance of pressure-sensitive adhesion properties, such as adhesive strength, cohesive force and tack, the tack of which can be controlled, which is excellent in initial reworkability when it is used for applying an optical film to an adherend or applying a protective film to an optical film, and which further exhibits excellent adhesive durability by virtue of rise of adhesive strength when such a film as above in the applied state is kept over a long period of time after application or especially when the film in the applied state is exposed to high temperatures or moist heat. A pressure-sensitive adhesive composition containing a specific acrylic diblock copolymer (I) and a specific acrylic triblock copolymer (II) in a specific proportion and a pressure-sensitive adhesive for optical films using the pressure-sensitive adhesive composition as a base are produced.

17 Claims, 1 Drawing Sheet

PRESSURE-SENSITIVE ADHESIVE COMPOSITION FOR OPTICAL FILMS AND PRESSURE-SENSITIVE ADHESION TYPE OPTICAL FILM

TECHNICAL FIELD

The present invention relates to a pressure-sensitive adhesive composition for optical films, containing acrylic block copolymers. More particularly, the present invention relates to a pressure-sensitive adhesive composition for optical films, containing a specific acrylic diblock copolymer and a specific acrylic triblock copolymer.

BACKGROUND ART

It has been known in the past that acrylic block copolymers or acrylic block copolymer compositions are used for pressure-sensitive adhesives. For example, a composition comprising a specific block copolymer having a structure represented by the general formula: -[a1]-[b]-[a2] in the polymer main chain and a diblock copolymer containing at least one (meth)acrylic acid alkyl ester polymer block is excellent not only in various pressure-sensitive adhesion properties such as holding power at high temperatures but also in heat resistance, weathering resistance and hot-melt coating properties and is preferable as a pressure-sensitive adhesive (particularly, hot-melt type pressure-sensitive adhesive) for obtaining pressure-sensitive adhesive sheets and pressure-sensitive adhesive tapes (see patent literature 1).

It is disclosed that a diblock copolymer, which is represented by the general formula: X-Y (in this formula, X is a polymer block mainly constituted of a methacrylic acid alkyl ester unit having an alkyl group of 1 to 4 carbon atoms or an alkyl group having a cyclic structure, and Y is a polymer block mainly constituted of an acrylic acid alkyl ester unit having an alkyl group of 1 to 20 carbon atoms and/or a methacrylic acid alkyl ester unit having an alkyl group of 5 to 20 carbon atoms) and in which the weight-average molecular weight (Mw) of the polymer block X is 1,000 to 8,000 and the ratio of the mass of the polymer block X to the mass of the polymer block Y, that is, X/Y mass ratio, is in the range of 1/99 to 10/90, is useful for obtaining an acrylic pressure-sensitive adhesive that is excellent not only in heat resistance, weathering resistance and various pressure-sensitive adhesion properties but also in hot-melt coating properties (see patent literature 2).

It is disclosed that by blending a block copolymer which has in a molecule at least an acrylic triblock structure wherein one or two acrylic acid ester-based polymer blocks and two or one (meth)acrylic acid ester-based polymer block having a different structure are bonded and which has a weight-average molecular weight (Mw) of not less than 120,000 and a molecular weight distribution of less than 1.5, with a diblock copolymer in which one acrylic acid ester-based polymer block and one (meth)acrylic acid ester-based polymer block having a different structure are bonded and which has a molecular weight distribution of less than 1.5, in a specific proportion, an acrylic block copolymer composition excellent in heat resistance, weathering resistance, bleed resistance, hot-melt properties, melt coating properties, and various pressure-sensitive adhesion properties, such as adhesive strength, cohesive force and tack, is obtained. It is described that various pressure-sensitive adhesion properties are further improved by setting the content of the (meth)acrylic acid ester-based polymer block in the block copolymer constituting the acrylic block copolymer composition to 5 to 22% by mass or by setting the weight-average molecular weight (Mw) of the block copolymer to not less than 150,000 (see patent literature 3).

However, it has not been specifically studied to apply the pressure-sensitive adhesive compositions disclosed in the above patent literatures 1 to 3 to pressure-sensitive adhesion type optical films. With regard to properties of solution type pressure-sensitive adhesives containing acrylic triblock copolymer, anything has not been mentioned at all.

On the other hand, pressure-sensitive adhesives for optical films are used for applying optical films such as polarizing plates and retardation films to liquid crystal panels or applying plural optical films to one another to laminate them or applying protective films to optical films.

In particular, the pressure-sensitive adhesives for optical films are required to have excellent transparency in addition to excellent performance balance as pressure-sensitive adhesives, and besides, they are required to be improved in reworkability, heat resistance, durability, etc.

Specifically, the pressure-sensitive adhesives for optical films are required to have not only transparency but also excellent optical isotropy (no birefringence) in order that the functions of optical films should not be impaired.

In the application of an optical film, an optical film or a protective film once applied is sometimes peeled off and applied again if wrinkles, bubbles, inclusion of foreign matters, deviation of application position, or the like occurs, or after peeling of the optical film, an expensive liquid crystal panel is sometimes recovered and recycled. From such viewpoints, the pressure-sensitive adhesives for optical films are required to have initial reworkability such that there is no adhesive transfer in the process for producing an image display device such as a display, peeling can be carried out with proper peel strength, and re-application is possible.

Further, the pressure-sensitive adhesives for optical films are required to have high durability such that even if the pressure-sensitive adhesive is heated or exposed to moist heat after application of an optical film and before actual use of the optical film, the pressure-sensitive adhesive does not undergo foaming or does not cause peeling of the film from an adherend.

A member comprising an optical film, a base and a pressure-sensitive adhesive layer containing an acrylic block copolymer is known (see patent literature 4). In this literature, however, initial reworkability necessary for pressure-sensitive adhesives for optical films has not been studied, though an effect on inhibiting ply separation and foaming in the pressure-sensitive adhesive layer has been studied in the case where the base is a gas releasing base such as polycarbonate or poly(methylmethacrylate).

Under such circumstances as above, the present inventors have developed a non-chemical crosslinking type pressure-sensitive adhesive for optical films containing a specific acrylic triblock copolymer as a main component, and previously applied for a patent (see patent literature 5). This non-chemical crosslinking type pressure-sensitive adhesive for optical films is free from a problem of variability in pressure-sensitive adhesion performance due to uneven crosslinking, exhibits good cohesive force, is excellent in initial reworkability, pressure-sensitive adhesion properties, heat resistance, durability, etc. and is useful as a pressure-sensitive adhesive for usual optical films. However, even this non-crosslinking type pressure-sensitive adhesive does not have sufficient initial reworkability and durability in some cases.

CITATION LIST

Patent Literature

Patent literature 1: Japanese Patent Laid-Open Publication No. 1999-323072
Patent literature 2: Japanese Patent Laid-Open Publication No. 2004-2736
Patent literature 3: Japanese Patent Laid-Open Publication No. 2005-307063
Patent literature 4: National Publication of International Patent No. 2008-508394
Patent literature 5: WO2008/065982
Patent literature 6: Japanese Patent Laid-Open Publication No. 199-335432
Patent literature 7: Japanese Patent Publication No. 1995-25859
Patent literature 8: Japanese Patent Laid-Open Publication No. 1994-93060

Non Patent Literature

Non patent literature 1: "Macromol. Chem. Phys.", 2000, vol. 201, pp. 1108-1114

SUMMARY OF INVENTION

Technical Problem

It is an object of the present invention to provide a pressure-sensitive adhesive composition for optical films, comprising an acrylic block copolymer, which is excellent in heat resistance, weathering resistance and bleed resistance and has an excellent balance of various pressure-sensitive adhesion properties, such as adhesive strength, cohesive force and tack, and whose tack can be controlled.

It is another object of the present invention to provide a pressure-sensitive adhesive composition for optical films, which initially exhibits adhesive strength suitable for reworking when used for applying an optical film to an adherend or applying a protective film to an optical film, which makes peeling of an applied film possible with proper peel strength without bringing about adhesive transfer, and which exhibits excellent adhesive durability by virtue of rise of adhesive strength when the film is kept in the applied state over a long period of time after application or especially when the film is exposed to high temperatures or moist heat.

It is a further object of the present invention to provide a pressure-sensitive adhesion type optical film and a protective film for optical films, each of which has a pressure-sensitive adhesive layer composed of the above pressure-sensitive adhesive composition for optical films, and an image display device having the pressure-sensitive adhesion type optical film and/or the protective film for optical films.

Solution to Problem

The present inventors have found that the above problems can be solved by blending a specific acrylic diblock copolymer, that is, a diblock copolymer in which one methacrylic acid alkyl ester polymer block and one acrylic acid alkyl ester polymer block are bonded to each other and which has an acrylic acid alkyl ester polymer block content of 10 to 55% by mass, a weight-average molecular weight (Mw) of 9,000 to 300,000 and a molecular weight distribution (Mw/Mn) of 1.0 to 1.5, with a specific acrylic triblock copolymer, that is, an acrylic triblock copolymer in which an acrylic acid alkyl ester polymer block having a glass transition temperature of not higher than −20° C. is present as a central block and to each end of the central block is bonded a methacrylic acid alkyl ester polymer block having a glass transition temperature of not lower than 100° C., and which has a central acrylic acid alkyl ester polymer block content of 82 to 95% by mass, a weight-average molecular weight (Mw) of 50,000 to 300,000 and a molecular weight distribution (Mw/Mn) of 1.0 to 1.5, in a specific proportion.

That is to say, the present invention is:

(1) a pressure-sensitive adhesive composition for optical films, having the following properties:

(α) the pressure-sensitive adhesive composition comprises the following acrylic diblock copolymer (I) satisfying the requirements (E1), (E2), (E3) and (E4) and the following acrylic triblock copolymer (II) satisfying the requirements (F1), (F2), (F3) and (F4), and (β) the mass ratio (I)/(II) of the acrylic diblock copolymer (I) to the acrylic triblock copolymer (II) is in the range of 70/30 to 20/80;

Acrylic Diblock Copolymer (I):

(E1) the acrylic diblock copolymer (I) is an acrylic diblock copolymer represented by the following general formula (1):

$$A\text{-}B \qquad (1)$$

wherein A is a methacrylic acid alkyl ester polymer block, and B is an acrylic acid alkyl ester polymer block, (E2) the content of the polymer block B is 10 to 55% by mass, (E3) the weight-average molecular weight (Mw) is 9,000 to 300,000, and (E4) the molecular weight distribution (Mw/Mn) is 1.0 to 1.5, Acrylic Triblock Copolymer (II):

(F1) the acrylic triblock copolymer (II) is an acrylic triblock copolymer represented by the following general formula (2):

$$C1\text{-}D\text{-}C2 \qquad (2)$$

wherein C1 and C2 are each independently a methacrylic acid alkyl ester polymer block having a glass transition temperature of not lower than 100° C., and D is an acrylic acid alkyl ester polymer block having a glass transition temperature of not higher than −20° C., (F2) the content of the polymer block D is 82 to 95% by mass, (F3) the weight-average molecular weight (Mw) is 50,000 to 300,000, and (F4) the molecular weight distribution (Mw/Mn) is 1.0 to 1.5.

The present invention is:

(2) a pressure-sensitive adhesion type optical film having a pressure-sensitive adhesive layer composed of the pressure-sensitive adhesive composition for optical films of (1).

The present invention is:

(3) a protective film for pressure-sensitive adhesion type optical films, having a pressure-sensitive adhesive layer composed of the pressure-sensitive adhesive composition for optical films of (1).

The present invention is:

(4) an image display device having the pressure-sensitive adhesion type optical film of (2) and/or the protective film for optical films of (3).

Advantageous Effects of Invention

The pressure-sensitive adhesive composition for optical films of the present invention is excellent in heat resistance, weathering resistance and bleed resistance, is excellent in various pressure-sensitive adhesion properties, such as adhesive strength, cohesive force and tack, initially has reworking adhesive strength when it is used for applying an optical film to an adherend, and exhibits durability by virtue of rise of adhesive strength when the optical film is kept in the applied state over a long period of time after application or especially when the film in the applied state is exposed to high temperatures or moist heat. Therefore, the pressure-sensitive adhesive composition for optical films can be efficiently used for producing pressure-sensitive adhesion type optical films or protective films for optical films, which are required to have both of reworkability and durability.

The pressure-sensitive adhesion type optical film or the protective film for optical films, which has a pressure-sensitive adhesive layer composed of the above pressure-sensitive adhesive composition for optical films, can be used for producing an image display device.

DESCRIPTION OF EMBODIMENTS

Figure 1:
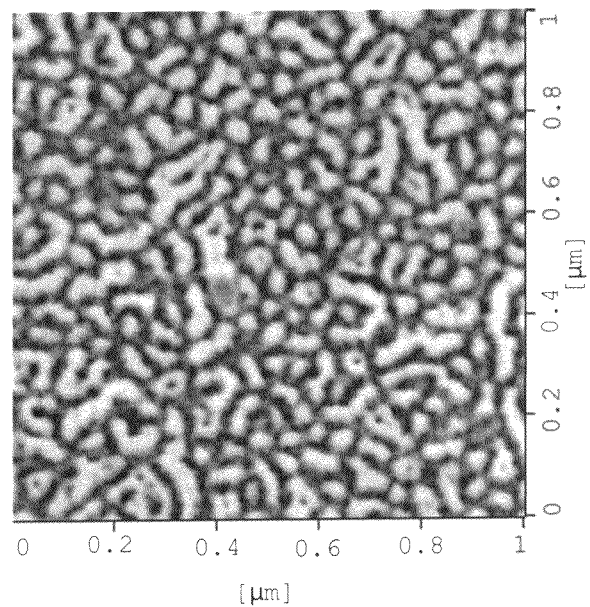
FIG. 1 is a phase image of a microphase separation structure of a pressure-sensitive adhesive layer of a pressure-sensitive adhesion type optical film obtained in Example 4, as measured by DFM.

The present invention is described below in detail. The pressure-sensitive adhesive composition for optical films of the present invention is a general name for pressure-sensitive adhesive compositions used for forming a pressure-sensitive adhesive layer on a part or the whole of one surface or both surfaces of an optical film to thereby apply the optical film to another adherend and pressure-sensitive adhesive compositions used for applying a protective film to a surface of an optical film in order to protect the surface of the optical film.

In the present invention, the optical films mean various films for general optical uses, and examples of such optical films include polarizing film, polarizing plate, retardation film, retardation plate, viewing angle enlarging film, luminance improving film, anti-reflection film, antiglare film, color filter, light guiding panel, diffusion film, prism sheet, electromagnetic wave shielding film, near infrared absorbing film and functional composite optical film having combined plural optical functions.

The protective films for optical films are films applied to the above-mentioned various optical films in order to protect surfaces of the optical films.

The acrylic diblock copolymer (I) contained in the pressure-sensitive adhesive composition for optical films of the present invention (also referred to as an "pressure-sensitive adhesive composition" simply hereinafter) satisfies the following requirements (E1) to (E4).

(E1) The acrylic diblock copolymer (I) is an acrylic diblock copolymer represented by the following general formula (1):

A-B    (1)

wherein A is a methacrylic acid alkyl ester polymer block, and B is an acrylic acid alkyl ester polymer block;

(E2) the content of the polymer block B is 10 to 55% by mass;

(E3) the weight-average molecular weight (Mw) is 9,000 to 300,000; and (E4) the molecular weight distribution (Mw/Mn) is 1.0 to 1.5.

In the acrylic diblock copolymer (I), the polymer block A is a polymer block composed of a methacrylic acid alkyl ester polymer. The glass transition temperature of the polymer block A is preferably not lower than 50° C., more preferably not lower than 100° C.

The polymer block A is obtained by polymerizing a methacrylic acid alkyl ester. Examples of such methacrylic acid alkyl esters include methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate.

Of the above methacrylic acid alkyl esters, methyl methacrylate is preferable. The polymer block A may be a block obtained by polymerizing only one kind of the methacrylic acid alkyl esters or may be a block obtained by polymerizing two or more kinds thereof.

In the acrylic diblock copolymer (I), the polymer block B is a polymer block composed of an acrylic acid alkyl ester polymer. The glass transition temperature of the polymer block B is preferably not higher than −20° C.

The polymer block B is obtained by polymerizing an acrylic acid alkyl ester. Examples of such acrylic acid alkyl esters include methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate.

Of the above acrylic acid alkyl esters, propyl acrylate, n-butyl acrylate, 2-ethylhexyl acrylate and n-octyl acrylate are preferable from the viewpoint that the glass transition temperature of the polymer block B becomes not higher than −20° C.

From the viewpoints that phase separation between the phase containing at least the resulting polymer block B as one component and the phase containing the polymer block A becomes clear, physical pseudo crosslinking by the phase containing the polymer block A as its component is not destroyed, and a pressure-sensitive adhesive composition having high cohesive force and excellent durability is obtained, n-butyl acrylate and 2-ethylhexyl acrylate are particularly preferable among the above acrylic acid alkyl esters.

The polymer block B may be a block obtained by polymerizing one kind of the acrylic acid alkyl esters or may be a block obtained by polymerizing two or more kinds thereof.

In the polymer blocks A and B to constitute the acrylic diblock copolymer (I), other monomer units may be contained within limits not detrimental to the effects of the present invention (e.g., not more than 10% by mass in the polymer blocks). Examples of the other monomers include (meth)acrylic acid esters other than the (meth)acrylic acid alkyl esters, such as methoxyethyl(meth)acrylate, ethoxyethyl(meth)acrylate, diethylaminoethyl(meth)acrylate, glycidyl (meth)acrylate and tetrahydrofurfuryl(meth)acrylate; aromatic vinyl compounds, such as styrene, α-methylstyrene and p-methylstyrene; conjugated dienes, such as butadiene and isoprene; and olefins, such as ethylene and propylene.

The content of the polymer block B in the acrylic diblock copolymer (I) is 10 to 55% by mass, preferably 10 to 49% by mass, more preferably 18 to 35% by mass.

When the content of the polymer block B in the acrylic diblock copolymer (I) is 10 to 55% by mass, the acrylic diblock copolymer (I) has high compatibility with the later-described acrylic triblock copolymer (II), and the pressure-sensitive adhesive composition has excellent transparency. If the content of the polymer block B is less than 10% by mass, the acrylic diblock copolymer (I) has low compatibility with the acrylic triblock copolymer (II), and the pressure-sensitive adhesive composition has poor transparency. On the other hand, if the content of the polymer block B exceeds 55% by mass, the content of the polymer block A that becomes at least one component of a phase that becomes a pseudo crosslinking site is relatively lowered, and hence, the cohesive force is lowered, and the durability of the pressure-sensitive adhesive composition is deteriorated. Moreover, the acrylic diblock copolymer (I) has low compatibility with the acrylic triblock copolymer (II), and the pressure-sensitive adhesive composition has poor transparency.

The content of the polymer block A in the acrylic diblock copolymer (I) is 90 to 45% by mass, preferably 90 to 51% by mass, more preferably 82 to 65% by mass.

The weight-average molecular weight (Mw) of the acrylic diblock copolymer (I) is 9,000 to 300,000. If Mw is less than 9,000, cohesive force of the pressure-sensitive adhesive composition is insufficient, and when an optical film is applied to an adherend with the pressure-sensitive adhesive composition, the film is liable to peel off, and the pressure-sensitive adhesive composition exhibits poor durability. On the other hand, if Mw exceeds 300,000, compatibility of the acrylic diblock copolymer (I) with the acrylic triblock copolymer (II) is lowered, and when a solution type pressure-sensitive adhesive is prepared from the pressure-sensitive adhesive composition, homogeneous coating becomes impossible because of occurrence of separation of the pressure-sensitive adhesive into two layers, or even if homogeneous coating is possible, separation occurs during the course of drying, resulting in poor transparency.

From the viewpoint of compatibility of the acrylic diblock copolymer (I) with the acrylic triblock copolymer (II), the weight-average molecular weight of the acrylic diblock copolymer (I) is preferably 18,000 to 200,000, more preferably 30,000 to 150,000.

The molecular weight distribution (Mw/Mn) of the acrylic diblock copolymer (I) is 1.0 to 1.5. If the molecular weight distribution (Mw/Mn) of the acrylic diblock copolymer (I) exceeds 1.5, influence of the low-molecular weight component is not negligible, and lowering of cohesive force or adhesive transfer in the reworking takes place.

From the viewpoints of improvement in cohesive force of the pressure-sensitive adhesive composition and reduction of adherend staining properties (adhesive transfer, adhesion of low-molecular weight component, etc.), the molecular weight distribution (Mw/Mn) of the acrylic diblock copolymer (I) is preferably 1.0 to 1.4, more preferably 1.0 to 1.3, still more preferably 1.0 to 1.2.

The acrylic triblock copolymer (II) contained in the pressure-sensitive adhesive composition of the present invention satisfies the following requirements (F1) to (F4).

(F1) The acrylic triblock copolymer (II) is an acrylic triblock copolymer represented by the following general formula (2):

C1-D-C2    (2)

wherein C1 and C2 are each independently a methacrylic acid alkyl ester polymer block having a glass transition temperature of not lower than 100° C., and D is an acrylic acid alkyl ester polymer block having a glass transition temperature of not higher than −20° C.;

(F2) the content of the polymer block D is 82 to 95% by mass;

(F3) the weight-average molecular weight (Mw) is 50,000 to 300,000; and (F4) the molecular weight distribution (Mw/Mn) is 1.0 to 1.5.

The two polymer blocks C1 and C2 in the acrylic triblock copolymer (II) are each a polymer block composed of a methacrylic acid alkyl ester polymer and having a glass transition temperature of not lower than 100° C.

When the glass transition temperatures of the polymer blocks C1 and C2 are each not lower than 100° C., these polymer blocks act as components of a restraint phase (physical pseudo crosslinking site) in the microphase separation structure formed in the pressure-sensitive adhesive composition of the present invention at a usual working temperature of the pressure-sensitive adhesive composition, and by virtue of appearance of cohesive force, excellent pressure-sensitive adhesion properties and durability are exhibited.

From the viewpoints of durability, heat resistance, base deformation follow-up performance, appropriate stress relaxation properties, etc., the glass transition temperatures of the polymer blocks C1 and C2 are each preferably 100 to 200° C., more preferably 100 to 150° C.

The polymer blocks C1 and C2 are each obtained by polymerizing a methacrylic acid alkyl ester. Examples of such methacrylic acid alkyl esters include methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate. Of these, methyl methacrylate is preferable.

The polymer blocks C1 and C2 may be each prepared from one kind of the methacrylic acid alkyl esters or may be each prepared from two kinds thereof. The polymer blocks C1 and C2 may be the same as or different from each other in the molecular weight, the type and ratio of the monomers for forming the polymer blocks, etc.

From the viewpoint that the performance based on the physical pseudo crosslinking of the polymer blocks C1 and C2 is further exerted, the polymer blocks C1 and C2 preferably have no group that contributes to chemical crosslinking.

The polymer block D in the acrylic triblock copolymer (II) is an acrylic acid alkyl ester polymer block having a glass transition temperature of not higher than −20° C.

When the glass transition temperature of the polymer block D is not higher than −20° C., the phase containing the polymer block D as its one component in the microphase separation structure in the pressure-sensitive adhesive composition imparts flexibility and wettability to the pressure-sensitive adhesive composition at a usual working temperature of the pressure-sensitive adhesive composition, and besides, the pressure-sensitive adhesive composition exhibits reworkability.

The glass transition temperature of the polymer block D is preferably not higher than −30° C., more preferably −40 to −80° C.

The polymer block D is obtained by polymerizing an acrylic acid alkyl ester. Examples of such acrylic acid alkyl esters include methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate.

Of the above acrylic acid alkyl esters, propyl acrylate, n-butyl acrylate, 2-ethylhexyl acrylate and n-octyl acrylate are preferable from the viewpoints that the glass transition temperature of the polymer block D becomes not higher than −20° C., adhesive strength and tack of the pressure-sensitive adhesive composition at a low temperature become good, and rise of adhesive strength in the high-speed peeling and zipping phenomenon can be inhibited.

From the viewpoints that phase separation between the phase containing at least the resulting polymer block D as one component and the phase containing the polymer blocks C1 and C2 as its components becomes clear, physical pseudo crosslinking by the phase containing the polymer blocks C1 and C2 as its components is not destroyed, and a pressure-sensitive adhesive having high cohesive force and excellent durability is obtained, n-butyl acrylate and 2-ethylhexyl acrylate are particularly preferable among the above acrylic acid alkyl esters.

The polymer block D may be a block obtained by polymerizing one kind of the acrylic acid alkyl esters or may be a block obtained by polymerizing two or more kinds thereof.

In the polymer blocks C1, C2 and D to constitute the acrylic triblock copolymer (II), other monomer units may be contained within limits not detrimental to the effects of the present invention (e.g., not more than 10% by mass in the polymer blocks). Examples of the other monomers include the same monomers as the aforesaid monomers which may be contained in the polymer blocks A and B.

The content of the polymer block D in the acrylic triblock copolymer (II) is 82 to 95% by mass, preferably 82 to 90% by mass, more preferably 82 to 87% by mass.

When the content of the polymer block D in the acrylic triblock copolymer (II) is 82 to 95% by mass, properties that proper adhesive strength that makes reworking possible is exhibited in the initial stage, and with rise of adhesive strength, durability is increased over a long period of time can be imparted to the pressure-sensitive adhesive composition of the present invention. If the content of the polymer block D is less than 82% by mass, adhesive strength and tack of the pressure-sensitive adhesive composition are lowered. On the other hand, if the content thereof exceeds 95% by mass, durability is lowered.

The total content of the polymer blocks C1 and C2 in the acrylic triblock copolymer (II) is 18 to 5% by mass, preferably 18 to 10% by mass, more preferably 18 to 13% by mass.

The weight-average molecular weight (Mw) of the acrylic triblock copolymer (II) is 50,000 to 300,000. If Mw is less than 50,000, cohesive force of the pressure-sensitive adhesive composition is insufficient, and when an optical film is applied to an adherend with the pressure-sensitive adhesive composition, the film is liable to peel off, and the pressure-sensitive adhesive composition exhibits poor durability. On the other hand, if Mw is more than 300,000, solution viscosity of a solution obtained by dissolving the acrylic triblock copolymer (II) in an organic solvent becomes high, and coating with the solution in a high concentration becomes difficult.

From the viewpoint of compatibility of durability and reworkability with each other, Mw of the acrylic triblock copolymer (II) is preferably 70,000 to 250,000, more preferably 90,000 to 220,000.

The molecular weight distribution (Mw/Mn) of the acrylic triblock copolymer (II) is 1.0 to 1.5. If the molecular weight distribution (Mw/Mn) of the acrylic triblock copolymer (II) exceeds 1.5, influence of the low-molecular weight component is not negligible, and lowering of cohesive force or adhesive transfer in the reworking takes place.

From the viewpoints that the cohesive force of the pressure-sensitive adhesive composition at a high temperature is enhanced and the durability thereof is made more excellent, the molecular weight distribution (Mw/Mn) of the acrylic triblock copolymer (II) is preferably 1.0 to 1.4, more preferably 1.0 to 1.3, still more preferably 1.0 to 1.2.

Here, the weight-average molecular weight (Mw), the number-average molecular weight (Mn) and the molecular weight distribution (Mw/Mn) of the acrylic diblock copolymer and the acrylic triblock copolymer in this specification are values determined by the methods described in the later-described examples.

As the acrylic triblock copolymer (II) contained in the pressure-sensitive adhesive composition of the present invention, only one kind of an acrylic triblock copolymer or a mixture of two or more kinds of acrylic triblock copolymers may be used provided that it satisfies the above requirements (F1) to (F4).

There is no specific limitation on the stereoregularity of the polymer blocks C1 and C2 to constitute the acrylic triblock copolymer (II), but the syndiotacticity of the polymer blocks C1 and C2 is preferably not less than 65%, more preferably 70 to 95%. When the syndiotacticity of the polymer blocks C1 and C2 is not less than 65%, durability of the pressure-sensitive adhesive composition tends to become good.

In the pressure-sensitive adhesive composition of the present invention, the mass ratio (I)/(II) of the acrylic diblock copolymer (I) to the acrylic triblock copolymer (II) is 70/30 to 20/80, preferably 70/30 to 30/70, more preferably 70/30 to 41/59, still more preferably 60/40 to 45/55.

When the mass ratio (I)/(II) of the acrylic diblock copolymer (I) to the acrylic triblock copolymer (II) is 70/30 to 20/80, the pressure-sensitive adhesive composition containing these copolymers has proper adhesive strength that makes reworking possible in the initial stage of adhesion to an adherend and comes to have high adhesive strength after the pressure-sensitive adhesive composition is kept in the adhering state for a long time, because keeping of the adhering state after adhesion increases adhesive strength, and therefore, the pressure-sensitive adhesive composition comes to exhibit high durability. Hence, the pressure-sensitive adhesive composition of the present invention containing these copolymers in the above mass ratio can be used as a pressure-sensitive adhesive composition excellent both in reworkability and durability.

If the content of the acrylic diblock copolymer (I) is larger than 70/30 (e.g., 90/10) in terms of a mass ratio (I)/(II) of the acrylic diblock copolymer (I) to the acrylic triblock copolymer (II), cohesive force of the pressure-sensitive adhesive composition is lowered, and durability thereof is lowered (e.g., long-term keeping of the adhering state becomes difficult). On the other hand, if the content of (I) is smaller than 20/80 (e.g., 10/90) in terms of (I)/(II), properties that the adhesive strength rises after heat treatment cannot be imparted. If the content of (I) is smaller than 30/70, durability tends to be lowered.

When the mass ratio (I)/(II) of the acrylic diblock copolymer (I) to the acrylic triblock copolymer (II) is 70/30 to 20/80, the initial adhesive strength (e.g., adhesive strength after storage at 23° C. for 24 hours after laminating) of the pressure-sensitive adhesive composition of the present invention to an adherend under the conditions of a peel rate of 300 mm/min and a peel direction of 180° is preferably 0.03 N/25 mm to 15.0 N/25 mm, more preferably 0.03 N/25 mm to 12.0 N/25 mm, still more preferably 0.03 N/25 mm to 2.0 N/25 mm, particularly preferably 0.03 to 1.5 N/25 mm. Further, in the rolling ball tack test, a ball No. 3 of the ball tack test defined in JIS Z0237 is rolled by an entrance length of 7.5 cm on a slope having an inclination angle of 5°, and after drop of the ball on a pressure-sensitive adhesive horizontal plane from the slope and before stop of the ball, the distance moved by the ball on the pressure-sensitive adhesive horizontal plane is measured. This distance is preferably 0.1 cm to 25 cm. On that account, the pressure-sensitive adhesive composition of the present invention has proper adhesive strength that makes reworking possible, and also has tack.

The ratio (X)/(Y) of the total mass (X) of the polymer block A contained in the acrylic diblock copolymer (I) and the polymer blocks C1 and C2 contained in the acrylic triblock copolymer (II) to the total mass (Y) of the polymer block B contained in the acrylic diblock copolymer (I) and the polymer block D contained in the acrylic triblock copolymer (II) is preferably 30/70 to 50/50, more preferably 33/67 to 45/55, still more preferably 35/65 to 42/58. If the content of (X) is smaller than 30/70 in terms of the ratio (X)/(Y), durability sometimes becomes insufficient. If the content of (X) is larger than 50/50, the initial adhesive strength is too low, and therefore, adhesion is impossible, or peeling sometimes occurs immediately after adhesion.

The weight-average molecular weight (Mw) of the polymer block A of the acrylic diblock copolymer (I) is preferably 6,000 to 60,000, more preferably 15,000 to 52,000, from the viewpoint that the acrylic diblock copolymer (I) has excellent compatibility with the acrylic triblock copolymer (II) and has excellent transparency. If the weight-average molecular weight (Mw) of the acrylic diblock copolymer (I) is less than 6,000, durability of the pressure-sensitive adhesive composition sometimes becomes insufficient. If the weight-average molecular weight (Mw) thereof is more than 60,000, solution viscosity of a solution obtained by dissolving the pressure-sensitive adhesive composition in an organic solvent becomes high, and coating with a solution containing the acrylic diblock copolymer (I) and triblock copolymer (II) in high concentrations sometimes becomes impossible.

The total content of the acrylic diblock copolymer (I) and the acrylic triblock copolymer (II) in the pressure-sensitive adhesive composition of the present invention is preferably not less than 75% by mass, more preferably not less than 80% by mass, based on the mass of solid matters of the pressure-sensitive adhesive composition (total mass of all the solid matters contained in the pressure-sensitive adhesive composition).

If the total content of the acrylic diblock copolymer (I) and the acrylic triblock copolymer (II) is less than 75% by mass based on the mass of solid matters of the pressure-sensitive adhesive composition, cohesive force is lowered, and the durability of the pressure-sensitive adhesive composition tends to be lowered (e.g., long-term keeping of the adhering state tends to become difficult).

In the pressure-sensitive adhesive composition of the present invention, physical pseudo crosslinking is formed, and therefore, cohesive force is exhibited, and excellent pressure-sensitive adhesion properties and durability are exerted. This physical pseudo crosslinking is derived from a microphase separation structure formed by the acrylic diblock copolymer (I) and the acrylic triblock copolymer (II), and a rigid polymer phase mainly formed from the polymer block A of the acrylic diblock copolymer (I) and the polymer blocks C1 and C2 of the acrylic triblock copolymer (II) contributes to this physical pseudo crosslinking.

The pressure-sensitive adhesive composition of the present invention has excellent flexibility and wettability, and a soft polymer phase mainly formed from the polymer block B of the acrylic diblock copolymer (I) and the polymer block D of the acrylic triblock copolymer (II) contributes to these properties.

The above-mentioned microphase separation structure usually forms a spherical structure, a cylindrical structure, a co-continuous structure, a lamella structure or the like according to the mass ratio, the volume ratio, the degree of polymerization, etc. of the polymer blocks.

In the present invention, the co-continuous structure indicates a spherical structure in which a spherical phase is present in a matrix phase, a cylindrical structure in which a rod-like phase is present in a matrix phase, or a structure other than the lamella structure, in which two or more phases overlap each other, and typical examples of the co-continuous structures include a gyroid structure and a PL (porous lamella) structure.

Each domain of the rigid polymer phase and the soft polymer phase is sometimes formed from one kind of a polymer block or sometimes formed from plural kinds of polymer blocks according to the mass ratio, the volume ratio, the degree of polymerization, etc. of each polymer block.

Continuity of a rigid polymer phase increases durability, while continuity of a soft polymer phase exhibits proper initial adhesive strength, and therefore, a microphase separation structure wherein the rigid polymer phase and the soft polymer phase together form a continuous structure is preferable.

Examples of the microphase separation structures wherein the rigid polymer phase and the soft polymer phase together form a continuous structure include a cylindrical structure in which a long and continuous rod-like phase (length of rod-like phase: not less than 500 nm, more preferably not less than 1 µm) composed of a rigid polymer is present in a matrix phase composed of a soft polymer, a co-continuous structure that is rich in a soft polymer component, a lamella structure, a co-continuous structure that is rich in a rigid polymer component, and a cylindrical structure in which a long and continuous rod-like phase (length of rod-like phase: not less than 500 nm, more preferably not less than 1 µm) composed of a soft polymer is present in a matrix phase composed of a rigid polymer.

Of these, a cylindrical structure in which a long and continuous rod-like phase composed of a rigid polymer is present in a matrix phase composed of a soft polymer and a co-continuous structure that is rich in a soft polymer component are preferable from the viewpoints of rise of adhesive strength with time and compatibility of reworkability with durability. It is presumed that by taking the above structure, the pressure-sensitive adhesive composition of the present invention exhibits excellent durability even in the case where the pressure-sensitive adhesive composition is used to laminate an optical film that undergoes expansion or contraction by the environmental variation such as variation of temperature and humidity to a member that hardly undergoes expansion or contraction by the environmental variation.

The process for preparing the acrylic diblock copolymer (I) and the acrylic triblock copolymer (II) used in the pressure-sensitive adhesive composition of the present invention is not specifically restricted as far as copolymers satisfying the above requirements are obtained, and processes based on publicly known techniques are adoptable. As a process for obtaining a block copolymer having a narrow molecular weight distribution, a process comprising living-polymerizing a monomer that is a constitutional unit is generally adopted. Examples of such processes comprising living polymerization include a process wherein polymerization is performed using an organic rare earth metal complex as a polymerization initiator (see patent literature 6), a process wherein anionic polymerization is performed using an organic alkaline metal compound as a polymerization initiator in the presence of a mineral acid salt such as an alkaline metal or alkaline earth metal salt (see patent literature 7), a process wherein anionic polymerization is performed using an organic alkaline metal compound as a polymerization initiator in the presence of an organoaluminum compound (see patent literature 8) and an atomic transfer radical polymerization process (ATRP) (see non patent literature 1).

In the process wherein anionic polymerization is performed in the presence of an oraganoaluminum compound among the above preparation processes, inclusion of a homopolymer that is a deactivated component is small because of low deactivation in the course of polymerization, and as a result, the resulting pressure-sensitive adhesive composition has high transparency. Further, since the conversion of the monomer is high, the amount of the residual monomer in the product is small, and when the resulting copolymer is used for a pressure-sensitive adhesive composition, occurrence of bubbles after lamination can be inhibited. Furthermore, the molecular structure of the methacrylic acid alkyl ester polymer block becomes highly syndiotactic, and this contributes to enhancement of durability when the resulting copolymer is used for a pressure-sensitive adhesive composition. Moreover, since living polymerization under relatively mild temperature conditions is possible, there is an advantage that the environmental burden (electrical power necessary for refrigerator for mainly controlling polymerization temperature) is small in the case of industrial production. From the above points, the acrylic diblock copolymer (I) and the acrylic triblock copolymer (II) are preferably prepared by the process wherein anionic polymerization is performed in the presence of an organoaluminum compound.

As the anionic polymerization process in the presence of an oraganoaluminum compound, there can be adopted, for example, a process comprising polymerizing a (meth)acrylic acid alkyl ester in the presence of an organolithium compound and an organoaluminum compound represented by the following general formula (3) while further adding, if necessary, an ether compound, such as dimethyl ether, dimethoxyethane, diethoxyethane or 12-crown-4, or a nitrogen-containing compound, such as triethylamine, N,N,N',N'-tetramethylethylenediamine, N,N,N',N'',N''-pentamethyldiethylenetriamine, 1,1,4,7,10,10-hexamethyltriethylenetetramine, pyridine or 2,2'-dipyridyl, to the reaction system;

$$AlR^1R^2R^3 \quad (3)$$

wherein $R^1$, $R^2$ and $R^3$ are each independently an alkyl group which may have a substituent, a cycloalkyl group which may have a substituent, an aryl group which may have a substituent, an aralkyl group which may have a substituent, an alkoxyl group which may have a substituent, an aryloxy group which may have a substituent or an N,N-disubstituted amino group; or $R^1$ is any one group of the above groups, and $R^2$ and $R^3$ together form an arylenedioxy group which may have a substituent.

Examples of the organolithium compounds include alkyllithiums and alkyldilithiums, such as methyllithium, ethyllithium, n-propyllithium, isopropyllithium, n-butyllithium, sec-butyllithium, isobutyllithium, tert-butyllithium, n-pentyllithium, n-hexyllithium, tetramethylenedilithium, pentamethylenedilithium and hexamethylenedilithium; aryllithiums and aryldilithiums, such as phenyllithium, m-tolyllithium, p-tolyllithium, xylyllithium and lithium naphthalene; aralkyllithiums and aralkyldilithiums, such as benzyllithium, diphenylmethyllithium, trityllithium, 1,1-diphenyl-3-methylpentyllithium, α-methylstyryllithium and dilithium formed by the reaction of diisopropenylbenzene with butyllithium; lithium amides, such as lithium dimethylamide, lithium diethylamide and lithium diisopropylamide; and lithium alkoxides, such as methoxylithium, ethoxylithium, n-propoxylithium, isopropoxylithium, n-butoxylithium, sec-butoxylithium, tert-butoxylithium, pentyloxylithium, hexyloxylithium, heptyloxylithium, octyloxylithium, benzyloxylithium and 4-methylbenzyloxylithium. These may be used singly or may be used in combination of two or more kinds.

Examples of the organoaluminum compounds represented by the general formula (3) include trialkylalumiums, such as trimethylaluminum, triethylaluminum, tri-n-butylaluminum, tri-s-butylaluminum, tri-t-butylaluminum, triisobutylaluminum, tri-n-hexylaluminum, tri-n-octylaluminum and tri-2-ethylhexylaluminum; dialkylphenoxyaluminums, such as dimethyl(2,6-di-tert-butyl-4-methylphenoxy)aluminum, dimethyl(2,6-di-tert-butylphenoxy)aluminum, diethyl(2,6-di-tert-butyl-4-methylphenoxy)aluminum, diethyl(2,6-di-tert-butylphenoxy)aluminum, diisobutyl(2,6-di-tert-butyl-4-methylphenoxy)aluminum, diisobutyl(2,6-di-tert-butylphenoxy)aluminum, di-n-octyl(2,6-di-tert-butyl-4-methylphenoxy)aluminum and di-n-octyl(2,6-di-tert-butylphenoxy)aluminum; alkyldiphenoxyaluminums, such as methylbis(2,6-di-tert-butyl-4-methylphenoxy)aluminum, methylbis(2,6-di-tert-butylphenoxy)aluminum, ethyl[2,2'-methylenebis(4-methyl-6-tert-butylphenoxy)]aluminum, ethylbis(2,6-di-tert-butyl-4-methylphenoxy)aluminum, ethylbis(2,6-di-tert-butylphenoxy)aluminum, ethyl[2,2'-methylenebis(4-methyl-6-tert-butylphenoxy)]aluminum, isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum, n-octylbis(2,6-di-tert-butyl-4-methylphenoxy)aluminum, n-octylbis(2,6-di-tert-butylphenoxy)aluminum and n-octyl[2,2'-methylenebis(4-methyl-6-tert-butylphenoxy)]aluminum; alkoxydiphenoxyaluminums, such as methoxybis(2,6-di-tert-butyl-4-methylphenoxy)aluminum, methoxybis(2,6-di-tert-butylphenoxy)aluminum, methoxy[2,2'-methylenebis(4-methyl-6-tert-butylphenoxy)]aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)]aluminum, isopropoxybis(2,6-di-tert-butyl-4-methylphenoxy)aluminum, isopropoxybis(2,6-di-tert-butylphenoxy)aluminum, isopropoxy[2,2'-methylenebis(4-methyl-6-tert-butylphenoxy)]aluminum, tert-butoxybis(2,6-di-tert-butyl-4-methylphenoxy)aluminum, tert-butoxybis(2,6-di-tert-butylphenoxy)aluminum and tert-butoxy[2,2'-methylenebis(4-methyl-6-tert-butylphenoxy)]aluminum; and triphenoxyaluminums, such as tris(2,6-di-tert-butyl-4-methylphenoxy)aluminum and tris(2,6-diphenylphenoxy)aluminum. Of these, isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)]aluminum are particularly preferable from the viewpoints that they are easy to handle and they can promote polymerization of a (meth)acrylic acid alkyl ester without being deactivated under relatively mild temperature conditions. These may be used singly or may be used in combination of two or more kinds.

The pressure-sensitive adhesive composition of the present invention may contain other components, such as tackifying resin, plasticizer, isocyanate compound, antistatic agent and silane coupling agent, when needed.

When the tackifying resin is incorporated in the pressure-sensitive adhesive composition of the present invention, control of tack, adhesive strength and holding power becomes easy.

As the tackifying resin, any of tackifying resins hitherto used can be used, and examples of such resins include natural resins, such as rosin-based resins and terpene-based resins;

and synthetic resins, such as petroleum resins, coumarone-indene-based resins, phenolic resins, xylene resins and styrene-based resins. Of these, terpene-based resins, such as hydrogenated terpene resin and terpene phenol; rosin-based resins, such as hydrogenated rosin ester, disproportionated rosin ester and polymerized rosin; petroleum resins, such as C5/C9 petroleum resin and aromatic petroleum resin; and styrene-based resins, such as α-methylstyrene polymer and styrene/α-methylstyrene copolymer, etc. are preferable. The tackifying resins may be used singly or may be used in combination of two or more kinds.

The softening point of the tackifying resin is preferably 50° C. to 150° C. from the viewpoint of appearance of high adhesive strength.

When the tackifying resin is contained in the pressure-sensitive adhesive composition of the present invention, the content of the tackifying resin is properly selected according to the type of an adherend, etc., but the content thereof is preferably not more than 25% by mass, more preferably not more than 20% by mass, still more preferably not more than 10% by mass, based on the total mass of all the solids matters contained in the pressure-sensitive adhesive composition. If the content of the tackifying resin is more than 25% by mass, cohesive force of the pressure-sensitive adhesive composition is lowered, and adhesive transfer tends to occur during the reworking operation.

Examples of the plasticizers include phthalic acid esters, such as dibutyl phthalate, di-n-octyl phthalate, bis-2-ethylhexyl phthalate, di-n-decyl phthalate and diisodecyl phthalate; adipic acid esters, such as bis-2-ethylhexyl adipate and di-n-octyl adipate; sebacic acid esters, such as bis-2-ethylhexyl sebacate and di-n-butyl sebacate; fatty acid esters, e.g., azelaic acid esters, such as bis-2-ethylhexyl azelate; paraffins, such as chlorinated paraffin; epoxy-based high-molecular plasticizers, such as epoxidized soybean oil and epoxidized linseed oil; phosphoric acid esters, such as trioctyl phosphate and triphenyl phosphate; phosphorous acid esters, such as triphenyl phosphite; acrylic oligomers, such as poly(n-butyl (meth)acrylate) and poly(2-ethylhexyl(meth)acrylate); polybutene: polyisobutylene; polyisoprene; process oil; naphthenic oil; polyester polyol, polyether polyol; and polyol compounds, e.g., polyalkylene glycols, such as polyethylene glycol and polypropylene glycol. The plasticizers may be used singly or may be used in combination of two or more kinds.

When the plasticizer is contained in the pressure-sensitive adhesive composition of the present invention, the content of the plasticizer is preferably not more than 25% by mass, more preferably not more than 10% by mass, based on the total mass of all the solids matters contained in the pressure-sensitive adhesive composition. If the content of the plasticizer is more than 25% by mass, cohesive force of the pressure-sensitive adhesive composition is lowered, and adhesive transfer tends to occur during the reworking operation.

When the isocyanate compound is incorporated in the pressure-sensitive adhesive composition of the present invention, adhesion to an adherend such as an optical film base is enhanced, and durability is also enhanced.

When the pressure-sensitive adhesive composition of the present invention contains the isocyanate compound, a functional group of an adherend and the isocyanate compound contained in the pressure-sensitive adhesive composition can form chemical bonding at the interface between the adherend such as an optical film base and the pressure-sensitive adhesive composition, whereby the adhesive strength to the adherend is enhanced, and higher durability can be exhibited.

That is to say, it is presumed that on the surface of an optical film or a protective film for optical films, isocyanate-reactive functional groups, such as carboxyl group, hydroxyl group, thiol group, amino group and amide group, are present, and therefore, the isocyanate compound in the pressure-sensitive adhesive composition reacts with the surface of the optical film or the protective film for optical films and serves to enhance interfacial adhesive strength between the optical film or the protective film for optical films and the pressure-sensitive adhesive composition.

The isocyanate compound is a compound having one or more isocyanate groups in a molecule. However, from the viewpoint of enhancement of interfacial adhesive strength between the adherend such as an optical film base and the pressure-sensitive adhesive composition, an isocyanate compound having two or more isocyanate groups in one molecule is preferable, and an isocyanate compound having three or more isocyanate groups in one molecule is particularly preferable.

Examples of the isocyanate compounds include aliphatic isocyanate compounds, alicyclic isocyanate compounds, aromatic isocyanate compounds, adducts of these isocyanate compounds (particularly polyisocyanate compounds) with polyols, and isocyanurate adducts.

Particular examples of the isocyanate compounds include aliphatic diisocyanate compounds, such as butylene diisocyanate and hexamethylene diisocyanate; alicyclic diisocyanate compounds, such as cyclopentylene diisocyanate, cyclohexylene diisocyanate and isophorone diisocyanate; aromatic diisocyanate compounds, such as 2,4-tolylene diisocyanate, 4,4'-diphenylmethane diisocyanate and xylylene diisocyanate; polyisocyanate compounds obtained by addition of diisocyanate compounds with polyols, such as trimethylolpropane/tolylene diisocyanate trimer adduct and trimethylolpropane/hexamethylene diisocyanate trimer adduct; and isocyanurate adducts, such as isocyanurate form of hexamethylene diisocyanate.

Of the above isocyanate compounds, the trimethylolpropane/tolylene diisocyanate trimer adduct is on the market under the trade name of "Colonate L", the trimethylolpropane/hexamethylene diisocyanate trimer adduct is on the market under the trade name of "Colonate HL", the isocyanurate form of tolylene diisocyanate is on the market under the trade name of "Colonate 2030" or "Colonate 2233", and the isocyanurate form of hexamethylene diisocyanate is on the market under the trade name of "Colonate HX", all being available from Nippon Polyurethane Industry Co., Ltd. These isocyanate compounds may be used singly or may be used in combination of two or more kinds.

When the isocyanate compound is contained in the pressure-sensitive adhesive composition of the present invention, the content of the isocyanate compound is preferably not more than 0.5% by mass, more preferably not more than 0.35% by mass, still more preferably not more than 0.22% by mass, in terms of a content of isocyanate groups in the isocyanate compound, based on the mass of solid matters of the pressure-sensitive adhesive composition (i.e., total mass of solid matters contained in the pressure-sensitive adhesive composition).

Here, the isocyanate group content in the isocyanate compound based on the mass of solid matters of the pressure-sensitive adhesive composition is determined by the following mathematical formula <1>:

$$C_{NCO} (\% \text{ by mass}) = [\{W_{iso} \times n(42/M_{iso})\} W_s] \times 100 \qquad <1>$$

wherein $C_{NCO}$ is an isocyanate group content (% by mass) in the isocyanate compound based on the mass of solid matters of the pressure-sensitive adhesive composition, $W_{iso}$ is an amount (mass)) of the isocyanate compound in the pressure-sensitive adhesive composition, $M_{iso}$ is a molecular weight of the isocyanate compound, n is the number of isocyanate groups in the isocyanate compound, and Ws is a content (mass) of solid matters in the pressure-sensitive adhesive composition.

In order to enhance reactivity of the isocyanate compound, a reaction catalyst may be further used in combination. Examples of the reaction catalysts include amine-based catalysts, DBU (1,8-diazabicyclo[5.4.0]undecene-7) and metal-based catalysts. Specifically, there can be mentioned tetramethylbutanediamine, 1,4-diazabicyclo[2.2.2]octane, dibutyltin dilaurate, tin octoate, N-ethylmorpholine, triethylamine, N,N,N',N'-tetramethyl-1,3-butanediamine, triethylenediamine, cobalt naphthenate, stannous chloride, tetra-n-butyltin, stannic chloride, trimethyltin hydroxide, dimethyltin dichloride, di-n-butyltin dilaurate, etc. These reaction catalysts may be used singly or may be used in combination of two or more kinds.

When the antistatic agent is incorporated in the pressure-sensitive adhesive composition of the present invention, antistatic ability can be imparted to the pressure-sensitive adhesive composition.

Examples of the antistatic agents include ion conducting agents made from alkaline metal salts, ionic liquids, surface active agents, conductive polymers, metal oxides, carbon black and carbon nano materials. Of these antistatic agents, ion conducting agents made from alkaline metal salts and ionic liquids are preferable from the viewpoints of permanent antistatic properties and non-discoloring properties. These antistatic agents may be used singly or may be used in combination of two or more kinds.

When the pressure-sensitive adhesive composition of the present invention contains the antistatic agent, the content of the antistatic agent is preferably 0.1 to 10% by mass, more preferably 0.15 to 8% by mass, still more preferably 0.2 to 6% by mass, based on the mass of solid matters of the pressure-sensitive adhesive composition, from the viewpoints of antistatic effect, etc.

When the silane coupling agent is incorporated in the pressure-sensitive adhesive composition of the present invention, adhesion of the pressure-sensitive adhesive composition to glass under high humidity can be enhanced. The silane coupling agent usually has alkoxy groups such as methoxy groups and ethoxy groups. These alkoxy groups are hydrolyzed into silanol groups, and the silanol groups are partially condensed and then fixed to the glass surface through adsorption, hydrogen bonding or chemical bonding, whereby durability is enhanced.

Examples of the silane coupling agents include 3-glycidoxypropyltrimethoxysilane, 2-(3,4-epoxycyclohexyl)ethyltrimethoxysilane, 3-glycidoxypropylmethyldiethoxysilane, 3-glycidoxypropyltriethoxysilane, 3-mercaptopropyltrimethoxysilane, vinyltrimethoxysilane, vinyltriethoxysilane, 3-methacryloxypropyltrimethoxysilane, 3-methacryloxypropyltriethoxysilane, 3-aminopropyltrimethoxysilane, 3-aminopropyltriethoxysilane, 3-isocyanatopropyltriethoxysilane and 3-acetoacetatopropyltrimethoxysilane. These silane coupling agents may be used singly or may be used in combination of two or more kinds.

When the silane coupling agent is contained in the pressure-sensitive adhesive composition of the present invention, the content thereof is preferably 0.01 to 3% by mass, more preferably 0.1 to 1 by mass, based on the mass of solid matters of the pressure-sensitive adhesive composition, from the viewpoint of improvement in durability reliability and adhesion reliability.

As other components which may be incorporated in the pressure-sensitive adhesive composition of the present invention, there can be mentioned, for example, antioxidants or ultraviolet ray absorbers to further improve weathering resistance, heat resistance and oxidation resistance; fillers, such as calcium carbonate, titanium oxide, mica, talc, glass fiber and organic reinforcing fiber; light diffusing agents, near infrared ray absorbers, and colorants.

When the pressure-sensitive adhesive composition of the present invention contains tackifying resin, plasticizer, crosslinking agent, antistatic agent, silane coupling agent and other components, the total amount of these components contained is preferably not more than 25% by mass, more preferably not more than 20% by mass, still more preferably not more than 10% by mass, based on the total mass of all the solid matters contained in the pressure-sensitive adhesive composition.

The pressure-sensitive adhesive composition of the present invention may be used as a solution type pressure-sensitive adhesive or may be used as a solid pressure-sensitive adhesive. The solution type pressure-sensitive adhesive can be prepared by dissolving the pressure-sensitive adhesive composition in an organic solvent, such as toluene, ethyl acetate, butyl acetate or methyl ethyl ketone, at a relatively low temperature (usually temperature of about 0 to 70° C.). The solid pressure-sensitive adhesive can be prepared by mixing the pressure-sensitive adhesive composition using a publicly known kneading machine, such as kneader-ruder, extruder, mixing roll or Banbury mixer, usually at a temperature of 100° C. to 250° C.

It is preferable to use the pressure-sensitive adhesive composition of the present invention as a solution type pressure-sensitive adhesive, and a thin pressure-sensitive adhesive layer having a uniform thickness can be formed on an adherend such as a base without using high-temperature heating and without bringing about deformation, change of properties, orientation, residual stress, etc. of an adherend or a base.

When the pressure-sensitive adhesive composition of the present invention is dissolved in an organic solvent, the resulting solution particularly exhibits a low solution viscosity even if the solids concentration is high (not less than 35% by mass). For example, when the pressure-sensitive adhesive composition of the present invention is dissolved in toluene to give a solution having a solids concentration of 45% by mass, the solution viscosity at 25° C. as measured by a B type viscometer can be usually set in the range of 1000 to 4000 mPa·s, preferably 1500 to 3500 mPa·s, more preferably 2000 to 3500 mPa·s Therefore, even if the amount of the organic solvent used is decreased, a solution type pressure-sensitive adhesive having a higher solids concentration (solids concentration: not less than 35% by mass) than that of the conventional pressure-sensitive adhesives can be obtained from the pressure-sensitive adhesive composition of the present invention, and the solution type pressure-sensitive adhesive is excellent in handling properties and process characteristics (reduction of drying burden, increase of coating velocity, omission of curing step, etc.) in the coating process.

In the case of the pressure-sensitive adhesive composition of the present invention, a chemical crosslinking reaction step that is necessary for the conventional crosslinking type acrylic pressure-sensitive adhesives can be omitted from the production process for pressure-sensitive adhesive products, and therefore, productivity is enhanced. Moreover, the pressure-sensitive adhesive composition of the present invention exhibits excellent storage stability when a solution type pressure-sensitive adhesive is formed from the pressure-sensitive adhesive composition, and for example, in the production of a pressure-sensitive adhesion type optical film, the solution type pressure-sensitive adhesive containing the pressure-sensitive adhesive composition can be stored as it is in a pressure-sensitive adhesive tank for a long period of time, or can be recovered and reused.

On the other hand, in the case of the conventional crosslinking type pressure-sensitive adhesives, a two-part pressure-sensitive adhesive consisting of a main agent and a crosslinking agent is the main stream, and after mixing of the two parts, crosslinking reaction proceeds in this pressure-sensitive adhesive even at room temperature. Therefore, unless the pressure-sensitive adhesive is rapidly used after mixing, pressure-sensitive adhesion properties or coating properties are changed.

In the conventional crosslinking type acrylic pressure-sensitive adhesives, the above crosslinking reaction proceeds in the drying step or during storage of the products. Therefore, uneven crosslinking occurs depending upon the drying conditions (temperature, airflow rate, line speed, etc.) or the storage conditions (storage term, temperature, etc.), and there is a trouble of occurrence of variability in pressure-sensitive adhesion performance of the products. However, the pressure-sensitive adhesive composition of the present invention is free from such a trouble.

The pressure-sensitive adhesion type optical film or the protective film for optical films of the present invention is produced by forming at least one pressure-sensitive adhesive layer composed of the pressure-sensitive adhesive composition of the present invention on a part or the whole of one or both surfaces of an optical film base or a protective film base.

The pressure-sensitive adhesion type optical film or the protective film for optical films can be produced by, for example, (i) a process comprising coating the optical film base or the protective film base for optical films with the pressure-sensitive adhesive composition of the present invention, or (ii) a process comprising coating a release film such as a polyethylene terephthalate film, which has been subjected to release treatment in advance, with the pressure-sensitive adhesive composition of the present invention and overlaying it on the optical film base or the protective film base for optical films to transfer the pressure-sensitive adhesive layer to the optical film base or the protective film base for optical films.

The optical film base is generally produced from a plastic material, and examples of such plastic materials include polyethylene terephthalate (PET), triacetyl cellulose (TAC), polyvinyl alcohol (PVC), polycarbonate, cycloolefin-based resin, styrene/methyl methacrylate copolymer resin (MS resin), acrylic resin, and ultraviolet curing acrylic resin.

These plastic materials are properly used according to the function of the optical film. For example, when the optical film is used as a polarizing plate, a multilayer film wherein on each surface of a PVA film having been orientated by adsorption of a dichroic dye (mainly iodine), a TAC film filling the role of a protective film is laminated for the purpose of enhancing film strength and thereby inhibiting contraction in the moist heat/heat environment, or the like is generally used. When the optical film is used as a polarizing plate imparted with retardation function, a multilayer film wherein TAC that is a protective film is coated with a discotic liquid crystal, a laminated film wherein a retardation film obtained by stretching polycarbonate, a cycloolefin-based resin or the like is laminated onto a PVA film instead of TAC that is a protective film, or the like is used. When the optical film is used as a prism sheet, a film wherein a prism is formed on a PET film using a photo-curable acrylic resin, or the like is used, and when the optical film is used as a diffusion plate, a film produced from MS resin, polycarbonate or the like is used.

When the optical film is used as a diffusion film, a film wherein a PET film or a polycarbonate film is coated with a bead layer, a film obtained by subjecting a PET film or a polycarbonate film to surface processing, a film containing an internal diffusing agent therein, or the like is used. When the optical film is used as a light guiding panel, a film obtained by subjecting a surface of a plate (film) produced from an acrylic resin to special processing and then sometimes laminating a reflective sheet produced from a PET film onto the lower side surface of the plate is used.

Examples of the plastic materials used for the protective film bases for optical films include polyethylene terephthalate (PET), polypropylene (PP), polyethylene (PE), such as high-density polyethylene (HDPE), low-density polyethylene (LDPE) or linear low-density polyethylene (LLDPE), polyvinyl chloride (PVC) and an ethylene/vinyl acetate copolymer (EVA). The film formed from such a plastic material may be a single layer film or a multilayer film.

The pressure-sensitive adhesion type optical film and the protective film for optical films, each of which has a pressure-sensitive adhesive layer composed of the pressure-sensitive adhesive composition of the present invention, can be preferably used for various image display devices, such as liquid crystal display device, PDP, organic EL display device and electronic paper.

The pressure-sensitive adhesion type optical film and the protective film for optical films produced by the use of the pressure-sensitive adhesive composition of the present invention can be delivered, as they are, as products capable of being attached to liquid crystal panels or other adherends without performing annealing or curing that is necessary for the case of using crosslinking type acrylic pressure-sensitive adhesives, and they have excellent productivity.

The image display device generally comprises the aforesaid laminate of plural optical films. The pressure-sensitive adhesive used for laminating an optical film to a glass substrate or laminating different kinds of optical films together is desired to be able to bond them following a difference in coefficient of thermal expansion (dimensional change with temperature rise) between the optical film and the glass substrate or a difference in coefficient of thermal expansion between the optical films of different kinds.

The peel strength of the pressure-sensitive adhesion type optical film and the protective film for optical films of the present invention, as measured when they are kept at a high temperature, is desirably larger than the peel strength thereof as measured when they are kept at ordinary temperature (23° C.).

With regard to the pressure-sensitive adhesion type optical film and the protective film for optical films of the present invention, a ratio of change in adhesive strength, as calculated from the following formula (3) that compares a 180° peel strength after 24 hours at 90° C. with a 180° peel strength after 24 hours at 23° C., is usually not less than 20%, preferably not less than 150%, more preferably not less than 200%, still more preferably not less than 400%.

[(180° peel strength after 24 hours at 90° C.)−(180° peel strength after 24 hours at 23° C.)]±(180° peel strength after 24 hours at 23° C.)×100 [%]     (3)

The pressure-sensitive adhesion type optical film and the protective film for optical films produced by the use of the pressure-sensitive adhesive composition of the present invention and having such properties as above exhibit more excellent adhesive durability when they are applied to adherends and kept in the applied state over a long period of time after application or especially when they are exposed to high temperatures or moist heat.

EXAMPLES

The present invention is further described with reference to the following examples, but it should be construed that the present invention is in no way limited to those examples.

First, synthesis examples for acrylic diblock copolymers (I) [acrylic diblock copolymers (I-1) to (I-4)], an acrylic diblock copolymer (I-5), acrylic triblock copolymers (II) [acrylic triblock copolymers (II-1) and (II-2)], and acrylic triblock copolymers (II-3) and (II-4) are described.

In the following synthesis examples, the block copolymers were prepared in a conventional manner using purified dry chemicals.

Molecular weight, molecular weight distribution and composition of each block copolymer synthesized in the following each synthesis example, and glass transition temperature and conversion ratio of each polymer block were measured by the following methods.

(1) Measurement of number-average molecular weight (Mn), weight-average molecular weight (Mw) and molecular weight distribution (Mw/Mn) by gel permeation chromatography (GPC)

Apparatus: gel permeation chromatograph (HLC-8020) manufactured by Tosoh Corporation Column: "TSKgel GMHXL, G4000HXL" and "G5000HXL" manufactured by Tosoh Corporation were connected in series.

Eluent: tetrahydrofuran

Flow rate of eluent: 1.0 ml/min

Column temperature: 40° C.

Detection method: differential refractive index (RI)

Calibration curve: prepared using standard polystyrene (2) Measurement of content of each copolymer component by proton nuclear magnetic resonance ($^1$H-NMR) spectroscopy Apparatus: nuclear magnetic resonance apparatus (JNM-LA400) manufactured by JEOL Ltd.

Solvent: deuterated chloroform

Signals in the vicinities of 3.6 ppm and 4.0 ppm in the $^1$H-NMR spectrum were each assigned to an ester group (—O—CH$_3$) of a methyl methacrylate unit and an ester group (—O—CH$_2$—CH$_2$—CH$_2$—CH$_3$) of an n-butyl acrylate unit, respectively, and the content of the copolymer component was determined by a ratio of their integral values.

(4) Measurement of glass transition temperature (Tg)

An extrapolation starting temperature (Tgi) in a curve obtained by DSC measurement was taken as a glass transition temperature (Tg).

Apparatus: Mettler DSC-822

Conditions: heating rate 10° C./min (5) Measurement of conversion ratio of charged monomer (conversion ratio) by gas chromatography (GC)

Equipment: gas chromatograph GC-14A manufactured by Shimadzu Corporation

Column: "INERT CAP1" (df=0.4 μm, 0.25 mm I.D.×60 m) manufactured by GL Sciences Inc.

Analytical conditions: injection 300° C., detector 300° C., 60° C. (maintained for 0 min)→heating at 5° C./min→100° C. (maintained for 0 min)→heating at 15° C./min 300° C. (maintained for 2 min)

« Synthesis Example 1 »

[Synthesis of Acrylic Diblock Copolymer (I-1)]

(1) The interior of a 0.5-liter three-neck flask was purged with nitrogen, and then 245 g of toluene and 12.2 g of 1,2-dimethoxyethane were introduced at room temperature. Subsequently, 29.0 g of a toluene solution containing 13.0 mmol of isobutylbis(2,6-di-t-butyl-4-methylphenoxy)aluminum was added, and 2.20 g of a mixed solution of cyclohexane and n-hexane containing 1.27 mmol of sec-butyllithium was further added. Next, to this mixed liquid, 30.3 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 31.2 g of n-butyl acrylate was dropwise added over a period of 2 hours. After the dropwise addition was completed, stirring was performed for 5 minutes at −30° C., and thereafter, 1.67 g of aqueous acetic acid was added to terminate the polymerization reaction. At this time, the conversion ratio of the n-butyl acrylate was not less than 99.9%. The resulting reaction solution was poured into 15 kg of methanol to form a white precipitate. The white precipitate was recovered by filtration and dried to obtain 61.2 g of a diblock copolymer (referred to as an "acrylic diblock copolymer (I-1)" hereinafter).

(2) The acrylic diblock copolymer (I-1) obtained above was subjected to $^1$H-NMR measurement and GPC measurement, and as a result, this copolymer was a diblock copolymer constituted of poly(methyl methacrylate)-poly(n-butyl acrylate) and had a weight-average molecular weight (Mw) of 58,500, a number-average molecular weight (Mn) of 39,800 and a molecular weight distribution (Mw/Mn) of 1.47. The content of each polymer block in the acrylic diblock copolymer (I-1) was as follows: the content of the methyl methacrylate polymer block (polymer block A) was 50.1% by mass, and the content of the n-butyl acrylate polymer block (polymer block B) was 49.9% by mass. At the time when polymerization of methyl methacrylate was completed, the reaction solution was sampled, and the sample was subjected to GPC measurement. As a result, the methyl methacrylate polymer block had a weight-average molecular weight (Mw) of 26,100, a number-average molecular weight (Mn) of 23,300 and a molecular weight distribution (Mw/Mn) of 1.12. Further, the glass transition temperature of each polymer block of the acrylic diblock copolymer (I-1) obtained above was determined, and the results are set forth in Table 1.

« Synthesis Example 2 »

[Synthesis of Acrylic Diblock Copolymer (I-2)]

(1) The interior of a 0.5-liter three-neck flask was purged with nitrogen, and then 234 g of toluene and 11.7 g of 1,2-dimethoxyethane were introduced at room temperature. Subsequently, 43.0 g of a toluene solution containing 4.34 mmol of isobutylbis(2,6-di-t-butyl-4-methylphenoxy)aluminum was added, and 3.23 g of a mixed solution of cyclohexane and n-hexane containing 1.86 mmol of sec-butyllithium was further added. Next, to this mixed liquid, 44.4 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 15.3 g of n-butyl acrylate was dropwise added over a period of 2 hours. After the dropwise addition was completed, stirring was performed for 5 minutes at −30° C., and thereafter, 2.5 g of aqueous acetic acid was added to terminate the polymerization reaction. At this time, the conversion ratio of the n-butyl acrylate was not less than 99.9%. The resulting reaction solution was poured into 15 kg of methanol to form a white precipitate. The white precipitate was recovered by filtration and dried to obtain 58.5 g of a diblock copolymer (referred to as an "acrylic diblock copolymer (I-2)" hereinafter).

(2) The acrylic diblock copolymer (I-2) obtained above was subjected to $^1$H-NMR measurement and GPC measurement, and as a result, this copolymer was a diblock copolymer constituted of poly(methyl methacrylate)-poly(n-butyl acrylate) and had a weight-average molecular weight (Mw) of 37,100, a number-average molecular weight (Mn) of 32,100 and a molecular weight distribution (Mw/Mn) of 1.16. The content of each polymer block in the acrylic diblock copolymer (I-2) was as follows: the content of the methyl methacrylate polymer block (polymer block A) was 75.3% by mass, and the content of the n-butyl acrylate polymer block (polymer block B) was 24.7% by mass. At the time when polymerization of methyl methacrylate was completed, the reaction solution was sampled, and the sample was subjected to GPC measurement. As a result, the methyl methacrylate polymer block had a weight-average molecular weight (Mw) of 25,900, a number-average molecular weight (Mn) of 23,200 and a molecular weight distribution (Mw/Mn) of 1.12. Further, the glass transition temperature of each polymer block of the acrylic diblock copolymer (I-2) obtained above was determined, and the results are set forth in Table 1.

《 Synthesis Example 3 》

[Synthesis of Acrylic Diblock Copolymer (I-3)]
(1) The interior of a 2-liter three-neck flask was purged with nitrogen, and then 1400 g of toluene and 70.0 g of 1,2-dimethoxyethane were introduced at room temperature. Subsequently, 30.9 g of a toluene solution containing 13.3 mmol of isobutylbis(2,6-di-t-butyl-4-methylphenoxy)aluminum was added, and 11.6 g of a mixed solution of cyclohexane and n-hexane containing 6.67 mmol of sec-butyllithium was further added. Next, to this mixed liquid, 235.7 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 118.1 g of n-butyl acrylate was dropwise added over a period of 2 hours. After the dropwise addition was completed, stirring was performed for 5 minutes at −30° C., and thereafter, 12.2 g of aqueous acetic acid was added to terminate the polymerization reaction. At this time, the conversion ratio of the n-butyl acrylate was not less than 99.9%. Subsequently, the resulting reaction solution was poured into 15 kg of methanol to form an oily precipitate. Thereafter, the oily precipitate was recovered by decantation and dried to obtain 350.0 g of a diblock copolymer (referred to as an "acrylic diblock copolymer (I-3)" hereinafter).

(2) The acrylic diblock copolymer (I-3) obtained above was subjected to $^1$H-NMR measurement and GPC measurement, and as a result, this copolymer was a diblock copolymer constituted of poly(methyl methacrylate)-poly(n-butyl acrylate) and had a weight-average molecular weight (Mw) of 64,200, a number-average molecular weight (Mn) of 59,300 and a molecular weight distribution (Mw/Mn) of 1.08. The content of each polymer block in the acrylic diblock copolymer (I-3) was as follows: the content of the methyl methacrylate polymer block (polymer block A) was 67.7% by mass, and the content of the n-butyl acrylate polymer block (polymer block B) was 32.3% by mass. At the time when polymerization of methyl methacrylate was completed, the reaction solution was sampled, and the sample was subjected to GPC measurement. As a result, the methyl methacrylate polymer block had a weight-average molecular weight (Mw) of 40,000, a number-average molecular weight (Mn) of 37,000 and a molecular weight distribution (Mw/Mn) of 1.07. Further, the glass transition temperature of each polymer block of the acrylic diblock copolymer (I-3) obtained above was determined, and the results are set forth in Table 1.

《 Synthesis Example 4 》

[Synthesis of Acrylic Diblock Copolymer (I-4)]
(1) The interior of a 2-liter three-neck flask was purged with nitrogen, and then 1224 g of toluene and 61.2 g of 1,2-dimethoxyethane were introduced at room temperature. Subsequently, 30.9 g of a toluene solution containing 10.7 mmol of isobutylbis(2,6-di-t-butyl-4-methylphenoxy)aluminum was added, and 5.16 g of a mixed solution of cyclohexane and n-hexane containing 2.97 mmol of sec-butyllithium was further added. Next, to this mixed liquid, 156.3 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 151.6 g of n-butyl acrylate was dropwise added over a period of 2 hours. After the dropwise addition was completed, stirring was performed for 5 minutes at −30° C., and thereafter, 4.9 g of aqueous acetic acid was added to terminate the polymerization reaction. At this time, the conversion ratio of the n-butyl acrylate was not less than 99.9%. The resulting reaction solution was poured into 15 kg of methanol to form an oily precipitate. The oily precipitate was recovered by decantation and dried to obtain 306 g of a diblock copolymer (referred to as an "acrylic diblock copolymer (I-4)" hereinafter).

(2) The acrylic diblock copolymer (I-4) obtained above was subjected to $^1$H-NMR measurement and GPC measurement, and as a result, this copolymer was a diblock copolymer constituted of poly(methyl methacrylate)-poly(n-butyl acrylate) and had a weight-average molecular weight (Mw) of 123,000, a number-average molecular weight (Mn) of 109,000 and a molecular weight distribution (Mw/Mn) of 1.13. The content of each polymer block in the acrylic diblock copolymer (I-4) was as follows: the content of the methyl methacrylate polymer block (polymer block A) was 49.9% by mass, and the content of the n-butyl acrylate polymer block (polymer block B) was 50.1% by mass. At the time when polymerization of methyl methacrylate was completed, the reaction solution was sampled, and the sample was subjected to GPC measurement. As a result, the methyl methacrylate polymer block had a weight-average molecular weight (Mw) of 57,000, a number-average molecular weight (Mn) of 52,800 and a molecular weight distribution (Mw/Mn) of 1.08. Further, the glass transition temperature of each polymer block of the acrylic diblock copolymer (I-4) obtained above was determined, and the results are set forth in Table 1.

《 Synthesis Example 5 》

[Synthesis of Acrylic Diblock Copolymer (I-5)]
(1) The interior of a 2-liter three-neck flask was purged with nitrogen, and then 870 g of toluene and 44.0 g of 1,2-dimethoxyethane were introduced at room temperature. Subsequently, 30.9 g of a toluene solution containing 20.7 mmol of isobutylbis(2,6-di-t-butyl-4-methylphenoxy)aluminum was added, and 2.99 g of a mixed solution of cyclohexane and n-hexane containing 5.17 mmol of sec-butyllithium was further added. Next, to this mixed liquid, 21.7 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 288.4 g of n-butyl acrylate was dropwise added over a period of 2 hours. After the dropwise addition was completed, stirring was performed for 5 minutes at −30° C., and thereafter, 3.5 g of methanol was added to terminate the polymerization reaction. At this time, the conversion ratio of the n-butyl acrylate was not less than 99.9%. The resulting reaction solution was poured into 15 kg of methanol to form an oily precipitate. The oily precipitate was recovered by decantation and dried to obtain 310 g of a diblock copolymer (referred to as an "acrylic diblock copolymer (I-5)" hereinafter).

(2) The acrylic diblock copolymer (I-5) obtained above was subjected to $^1$H-NMR measurement and GPC measurement, and as a result, this copolymer was a diblock copolymer constituted of poly(methyl methacrylate)-poly(n-butyl acrylate) and had a weight-average molecular weight (Mw) of 67,000, a number-average molecular weight (Mn) of 55,400 and a molecular weight distribution (Mw/Mn) of 1.21. The content of each polymer block in the acrylic diblock copolymer (I-3) was as follows: the content of the methyl methacrylate polymer block (polymer block A) was 6.9% by mass, and the content of the n-butyl acrylate polymer block (polymer block B) was 93.1% by mass. At the time when polymerization of methyl methacrylate was completed, the reaction solution was sampled, and the sample was subjected to GPC measurement. As a result, the methyl methacrylate polymer block had a weight-average molecular weight (Mw) of 4,400, a number-average molecular weight (Mn) of 4,200 and a molecular weight distribution (Mw/Mn) of 1.05. Further, the glass transition temperature of each polymer block of the acrylic diblock copolymer (I-5) obtained above was determined, and the results are set forth in Table 1.

« Synthesis Example 6 »

[Synthesis of Acrylic Triblock Copolymer (II-1)]

(1) The interior of a 2-liter three-neck flask was purged with nitrogen, and then 1340 g of toluene and 67.0 g of 1,2-dimethoxyethane were introduced at room temperature. Subsequently, 50.0 g of a toluene solution containing 16.6 mmol of isobutylbis(2,6-di-t-butyl-4-methylphenoxy)aluminum was added, and 6.68 g of a mixed solution of cyclohexane and n-hexane containing 3.85 mmol of sec-butyllithium was further added. Next, to this mixed liquid, 27.0 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 283.2 g of n-butyl acrylate was dropwise added over a period of 2 hours. After the dropwise addition was completed, stirring was performed for 5 minutes at −30° C. At this time, the conversion ratio of the n-butyl acrylate was not less than 99.9%. To the solution, 27.0 g of methyl methacrylate was added, then stirring was performed for one night at room temperature, and thereafter, 7.57 g of aqueous acetic acid was added to terminate the polymerization reaction. At this time, the conversion ratio of the methyl methacrylate was not less than 99.9%. The resulting reaction solution was poured into 15 kg of methanol to form a white precipitate. The white precipitate was recovered by filtration and dried to obtain 335 g of a triblock copolymer (referred to as an "acrylic triblock copolymer (II-1)" hereinafter).

(2) The acrylic triblock copolymer (II-1) obtained in the above (1) was subjected to $^1$H-NMR measurement and GPC measurement, and as a result, this copolymer was a triblock copolymer constituted of poly(methyl methacrylate)-poly(n-butyl acrylate)-poly(methyl methacrylate) and had a weight-average molecular weight (Mw) of 98,500, a number-average molecular weight (Mn) of 88,500 and a molecular weight distribution (Mw/Mn) of 1.11. The content of each polymer block in the acrylic triblock copolymer (II-1) was as follows: the content of the methyl methacrylate polymer block (total content of polymer block C1 and polymer block C2) was 16.2% by mass, and the content of the n-butyl acrylate polymer block (polymer block D) was 83.8% by mass. Further, the glass transition temperature of each polymer block of the acrylic triblock copolymer (II-1) obtained above was determined, and the results are set forth in Table 1.

« Synthesis Example 7 »

[Synthesis of Acrylic Triblock Copolymer (II-2)]

(1) The interior of a 2-liter three-neck flask was purged with nitrogen, and then 1048 g of toluene and 52.4 g of 1,2-dimethoxyethane were introduced at room temperature. Subsequently, 50.0 g of a toluene solution containing 10.9 mmol of isobutylbis(2,6-di-t-butyl-4-methylphenoxy)aluminum was added, and 4.01 g of a mixed solution of cyclohexane and n-hexane containing 2.31 mmol of sec-butyllithium was further added. Next, to this mixed liquid, 18.0 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 221.2 g of n-butyl acrylate was dropwise added over a period of 2 hours. After the dropwise addition was completed, stirring was performed for 5 minutes at −30° C. At this time, the conversion ratio of the n-butyl acrylate was not less than 99.9%. To the solution, 24.5 g of methyl methacrylate was added, then stirring was performed for one night at room temperature, and thereafter, 13.0 g of aqueous acetic acid was added to terminate the polymerization reaction. At this time, the conversion ratio of the methyl methacrylate was not less than 99.9%. The resulting reaction solution was poured into 15 kg of methanol to form a white precipitate. The white precipitate was recovered by filtration and dried to obtain 262 g of a triblock copolymer (referred to as an "acrylic triblock copolymer (II-2)" hereinafter).

(2) The acrylic triblock copolymer (II-2) obtained in the above (1) was subjected to $^1$H-NMR measurement and GPC measurement, and as a result, this copolymer was a triblock copolymer constituted of poly(methyl methacrylate)-poly(n-butyl acrylate)-poly(methyl methacrylate) and had a weight-average molecular weight (Mw) of 155,000, a number-average molecular weight (Mn) of 135,600 and a molecular weight distribution (Mw/Mn) of 1.14. The content of each polymer block in the acrylic triblock copolymer (II-2) was as follows: the content of the methyl methacrylate polymer block (total content of polymer block C1 and polymer block C2) was 16.1% by mass, and the content of the n-butyl acrylate polymer block (polymer block D) was 83.9% by mass. Further, the glass transition temperature of each polymer block of the acrylic triblock copolymer (II-2) obtained above was determined, and the results are set forth in Table 1.

« Synthesis Example 8 »

[Synthesis of Acrylic Triblock Copolymer (II-3)]

(1) The interior of a 2-liter three-neck flask was purged with nitrogen, and then 656 g of toluene and 32.8 g of 1,2-dimethoxyethane were introduced at room temperature. Subsequently, 60.0 g of a toluene solution containing 40.2 mmol of isobutylbis(2,6-di-t-butyl-4-methylphenoxy)aluminum was added, and 3.44 g of a mixed solution of cyclohexane and n-hexane containing 1.98 mmol of sec-butyllithium was further added. Next, to this mixed liquid, 30.0 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 106.0 g of n-butyl acrylate was dropwise added over a period of 2 hours. After the dropwise addition was completed, stirring was performed for 5 minutes at −30° C. At this time, the conversion ratio of the n-butyl acrylate was not less than 99.9%. To the solution, 30.0 g of methyl methacrylate was added, then stirring was performed for one night at room temperature, and thereafter, 3.50 g of aqueous acetic acid was added to terminate the polymerization reaction. At this time, the conversion ratio of the methyl methacrylate was not less than 99.9%. The resulting reaction solution was poured into 15 kg of methanol to form a white precipitate. The white precipitate was recovered by filtration and dried to obtain 164 g of a triblock copolymer (referred to as an "acrylic triblock copolymer (II-3)" hereinafter).

(2) The acrylic triblock copolymer (II-3) obtained in the above (1) was subjected to $^1$H-NMR measurement and GPC measurement, and as a result, this copolymer was a triblock copolymer constituted of poly(methyl methacrylate)-poly(n-butyl acrylate)-poly(methyl methacrylate) and had a weight-average molecular weight (Mw) of 101,000, a number-average molecular weight (Mn) of 81,500 and a molecular weight distribution (Mw/Mn) of 1.24. The content of each polymer block in the acrylic triblock copolymer (II-3) was as follows: the content of the methyl methacrylate polymer block (total content of polymer block C1 and polymer block C2) was 36.0% by mass, and the content of the n-butyl acrylate polymer block (polymer block D) was 64.0% by mass. Further, the glass transition temperature of each polymer block of the acrylic triblock copolymer (II-3) obtained above was determined, and the results are set forth in Table 1.

《 Synthesis Example 9 》

[Synthesis of Acrylic Triblock Copolymer (II-4)]
(1) The interior of a 2-liter three-neck flask was purged with nitrogen, and then 1040 g of toluene and 52.0 g of 1,2-dimethoxyethane were introduced at room temperature. Subsequently, 60.0 g of a toluene solution containing 40.2 mmol of isobutylbis(2,6-di-t-butyl-4-methylphenoxy)aluminum was added, and 5.17 g of a mixed solution of cyclohexane and n-hexane containing 2.98 mmol of sec-butyllithium was further added. Next, to this mixed liquid, 25.0 g of methyl methacrylate was added. The color of the reaction solution was yellow at first, but after stirring for 60 minutes at room temperature, the reaction solution became colorless. At this time, the conversion ratio of the methyl methacrylate was not less than 99.9%. Subsequently, the internal temperature of the reaction solution was lowered to −30° C., and 204.0 g of n-butyl acrylate was dropwise added over a period of 2 hours. After the dropwise addition was completed, stirring was performed for 5 minutes at −30° C. At this time, the conversion ratio of the n-butyl acrylate was not less than 99.9%. To the solution, 35.0 g of methyl methacrylate was added, then stirring was performed for one night at room temperature, and thereafter, 3.50 g of methanol was added to terminate the polymerization reaction. At this time, the conversion ratio of the methyl methacrylate was not less than 99.9%. The resulting reaction solution was poured into 15 kg of methanol to form a white precipitate. The white precipitate was recovered by filtration and dried to obtain 260 g of a triblock copolymer (referred to as an "acrylic triblock copolymer (II-4)" hereinafter).

(2) The acrylic triblock copolymer (II-4) obtained in the above (1) was subjected to $^1$H-NMR measurement and GPC measurement, and as a result, this copolymer was a triblock copolymer constituted of poly(methyl methacrylate)-poly(n-butyl acrylate)-poly(methyl methacrylate) and had a weight-average molecular weight (Mw) of 115,000, a number-average molecular weight (Mn) of 104,500 and a molecular weight distribution (Mw/Mn) of 1.10. The content of each polymer block in the acrylic triblock copolymer (II-4) was as follows: the content of the methyl methacrylate polymer block (total content of polymer block C1 and polymer block C2) was 22.5% by mass, and the content of the n-butyl acrylate polymer block (polymer block D) was 77.5% by mass. Further, the glass transition temperature of each polymer block of the acrylic triblock copolymer (II-4) obtained above was determined, and the results are set forth in Table 1.

The details of the acrylic diblock copolymers (I-1) to (I-5) and the acrylic triblock copolymers (II-1) to (II-4) synthesized in the above Synthesis Examples 1 to 8 are together set forth in the following Table 1.

TABLE 1

|  | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 | Synthesis Ex. 8 | Synthesis Ex. 9 |
|---|---|---|---|---|---|---|---|---|---|
| [Block copolymer] Symbol | (I-1) | (I-2) | (I-3) | (I-4) | (I-5) | (II-1) | (II-2) | (II-3) | (II-4) |
| Type | A-B | A-B | A-B | A-B | A-B | C1-D-C2 | C1-D-C2 | C1-D-C2 | C1-D-C2 |
| Structure [1] | S1 | S1 | S1 | S1 | S1 | S2 | S2 | S2 | S2 |
| Content of PnBA block (% by mass) [2] | 49.9 | 24.7 | 32.3 | 50.1 | 93.1 | 83.8 | 83.9 | 64.0 | 77.5 |
| Weight-average molecular weight (Mw) [3] | 58,500 | 37,100 | 64,200 | 123,000 | 67,000 | 98,500 | 155,000 | 101,000 | 115,000 |
| Molecular weight distribution (Mw/Mn) [4] | 1.47 | 1.16 | 1.08 | 1.13 | 1.21 | 1.11 | 1.14 | 1.24 | 1.10 |
| Tg of PMMA block (° C.) | 106.5 | 106.0 | 112.8 | 114.3 | — | 103.5 | 106.4 | 108.1 | 104.5 |
| Tg of PnBA block (° C.) | −45.0 | −46.9 | −45.8 | −44.8 | −44.9 | −44.5 | −44.3 | −45.2 | −44.3 |
| Weight-average molecular weight of PMMA block (Mw) [5] | 26,100 | 25,900 | 40,000 | 57,000 | 4,400 | — | — | — | — |

[1] Structure of block copolymer
S1: PMMA-b-PnBA
S2: PMMA-b-PnBA-b-PMMA
[2] Content of PnBA block in diblock copolymer A-B or triblock copolymer C1-D-C2
[3] Weight-average molecular weight of block copolymer
[4] Molecular weight distribution of block copolymer
[5] Weight-average molecular weight of PMMA block in diblock copolymer A-B A material used in addition in the present invention is described below.

Polyethylene terephthalate (PET) film: Toyobo Ester Film E5000 (thickness: 50 μm), manufactured by Toyobo Co., Ltd.

Examples and comparative examples are described below. Evaluation of properties of pressure-sensitive adhesion type optical films obtained in the examples and the comparative examples was carried out in the following manner.

[Adhesive Force]

A pressure-sensitive adhesion type optical film prepared in the following example or comparative example was cut into a specimen having a size of a width of 25 mm and a length of 200 mm, and the specimen was applied to an air side surface of a glass plate that is an adherend by moving a 2 kg rubber roller on the specimen by 2 reciprocations. The specimen was stored for 24 hours under the conditions of 23° C. and 50% RH or for 24 hours under the conditions of 90° C. and drying, and thereafter, a 180° peel strength was measured at a peel rate of 30 mm/min or 300 mm/min. The measurement was carried out in accordance with JIS Z0237 except for the above conditions. As the glass plate, a glass plate obtained by subjecting a commercially available soda-lime glass plate having an alkali content to alkali cleaning was used.

[Creep Test (Holding Power Test)]

A pressure-sensitive adhesion type optical film prepared in the following example or comparative example was cut into a specimen having a size of 25 mm (crosswise direction: vertical direction to the direction of load)×10 mm (lengthwise direction: the same direction as the direction of load), and the specimen was applied to an air side surface of a glass plate that is an adherend by moving a 2 kg rubber roller on the specimen by 2 reciprocations. To the specimen, a weight of 1 kg was set, and the specimen was subjected to creep test in accordance with JIS Z 0237 under the conditions of 90° C. When the drop time was shorter than 1000 minutes, the drop time was measured as the test result, and when the drop time was not shorter than 1000 minutes, a positional shift distance of the specimen after 1000 minutes was measured as the test result.

This test is a test to examine durability of a pressure-sensitive adhesive (pressure-sensitive adhesive composition) under heating, and a shorter positional shift distance or a longer time before dropping of the specimen indicates more excellent durability of the pressure-sensitive adhesive (pressure-sensitive adhesive composition).

[Tack Test (Initial Adhesive Strength Test)]

A pressure-sensitive adhesion type optical film prepared in the following example or comparative example was cut into a specimen having a size of 200 mm (crosswise direction: vertical direction to the direction of load)×250 mm (lengthwise direction: the same direction as the direction of load), and a ball No. 3 according to the JIS Z0237 rolling ball tack method was passed on a slope having an inclination angle of 5° and a length of 7.5 cm, and then the distance passed by the ball on the pressure-sensitive adhesive surface of the specimen was measured. This test is a test to examine initial adhesive strength of a pressure-sensitive adhesive, and a shorter distance passed indicates higher initial adhesive strength of the pressure-sensitive adhesive.

[Observation of Microphase Separation Structure of Pressure-Sensitive Adhesive Layer]

A pressure-sensitive adhesion type optical film prepared in the following example or comparative example was placed on a stage of an apparatus in such a manner that the pressure-sensitive adhesive layer side surface faced up, and the surface of the pressure-sensitive adhesive layer was subjected to SPM observation.

Apparatus: A scanning type probe microscope (SPM) manufactured by SII Nanotechnology Inc. and an environmental control unit (E-seep) were used.

Measuring mode: DFM

Cantilever used: SI-DF20 (back surface: Al) (manufactured by SII Nanotechnology Inc.)

Measuring area: 1 μm×1 μm

Scanning frequency: 1.0 Hz

Scan division number: X=number of data=512, Y=number of data=256

《 Example 1 》

(1) 58.4 Parts by mass of the acrylic diblock copolymer (I-1) and 41.6 parts by mass of the acrylic triblock copolymer (II-1) prepared in Synthesis Example 1 and Synthesis Example 6, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a polyethylene terephalate film (thickness: 50 μm, the same shall apply hereinafter) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

《 Example 2 》

(1) 33.5 Parts by mass of the acrylic diblock copolymer (I-2) and 66.5 parts by mass of the acrylic triblock copolymer (II-1) prepared in Synthesis Example 2 and Synthesis Example 6, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength to a glass plate (glass adhesive strength) and the results of creep test and tack test are set forth in Table 2.

« Example 3 »

(1) 47.8 Parts by mass of the acrylic diblock copolymer (I-2) and 52.2 parts by mass of the acrylic triblock copolymer (II-1) prepared in Synthesis Example 2 and Synthesis Example 6, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

« Example 4 »

(1) 46.2 Parts by mass of the acrylic diblock copolymer (I-3) and 53.8 parts by mass of the acrylic triblock copolymer (II-1) prepared in Synthesis Example 3 and Synthesis Example 6, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

(4) Moreover, the surface of the pressure-sensitive adhesive layer of the pressure-sensitive adhesion type optical film obtained in the above (2) was subjected to observation of microphase separation structure using the aforesaid method, and as a result, an image shown in FIG. 1 was obtained. In FIG. 1, black parts show a rigid polymer phase composed of the polymer block A of the acrylic diblock copolymer (I) and the polymer blocks C1 and C2 of the acrylic triblock copolymer (II), while white parts show a soft polymer phase composed of the polymer block B of the acrylic diblock copolymer (I) and the polymer block D of the acrylic triblock copolymer (II).

« Example 5 »

(1) 46.3 Parts by mass of the acrylic diblock copolymer (I-3) and 53.7 parts by mass of the acrylic triblock copolymer (II-2) prepared in Synthesis Example 3 and Synthesis Example 7, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

« Example 6 »

(1) 58.9 Parts by mass of the acrylic diblock copolymer (I-4) and 41.1 parts by mass of the acrylic triblock copolymer (II-2) prepared in Synthesis Example 4 and Synthesis Example 7, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

Comparative Example 1»

(1) A pressure-sensitive adhesive composition composed of 100 parts by mass of the acrylic triblock copolymer (II-2) prepared in Synthesis Example 7, as shown in Table 2, was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

Figure 2:
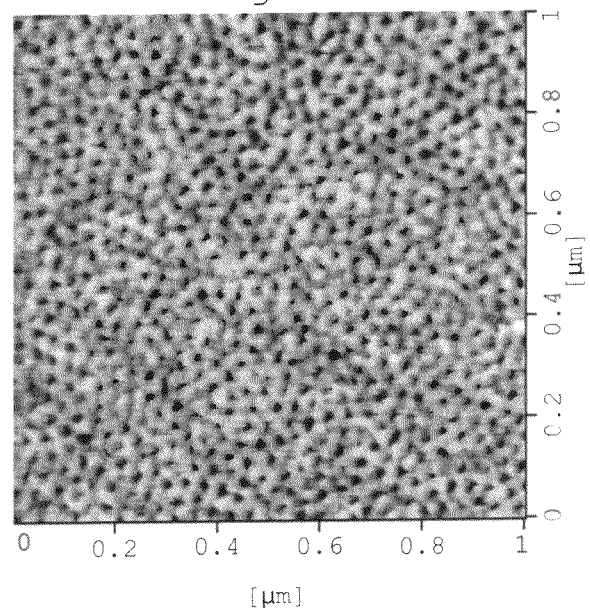
FIG. 2 is a phase image of a microphase separation structure of a pressure-sensitive adhesive layer of a pressure-sensitive adhesion type optical film obtained in Comparative Example 1, as measured by DFM.

(4) Moreover, the surface of the pressure-sensitive adhesive layer of the pressure-sensitive adhesion type optical film obtained in the above (2) was subjected to observation of microphase separation structure using the aforesaid method, and as a result, an image shown in FIG. 2 was obtained. In FIG. 2, black parts show a rigid polymer phase composed of the polymer blocks C1 and C2 of the acrylic triblock copolymer (II), while white parts show a soft polymer phase composed of the polymer block D of the acrylic triblock copolymer (II).

«Comparative Example 2»

(1) A pressure-sensitive adhesive composition composed of 100 parts by mass of the acrylic triblock copolymer (II-3) prepared in Synthesis Example 8, as shown in Table 2, was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

«Comparative Example 3»

(1) 50.7 Parts by mass of the acrylic diblock copolymer (I-4) and 49.3 parts by mass of the acrylic triblock copolymer (II-4) prepared in Synthesis Example 4 and Synthesis Example 8, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

«Comparative Example 4»

(1) 72.1 Parts by mass of the acrylic diblock copolymer (I-4) and 27.9 parts by mass of the acrylic triblock copolymer (II-1) prepared in Synthesis Example 4 and Synthesis Example 5, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 2.

«Comparative Example 5»

(1) 85.5 Parts by mass of the acrylic diblock copolymer (I-4) and 14.5 parts by mass of the acrylic triblock copolymer (II-2) prepared in Synthesis Example 4 and Synthesis Example 6, respectively, were weighed out as shown in Table 2, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had turbid appearance, and when it was allowed to stand still, it separated into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 2. The pressure-sensitive adhesive layer underwent macrophase separation and was opaque, and the transparency of the pressure-sensitive adhesion type optical film was lowered.

TABLE 2

|  | Ex. 1 | Ex. 2 | Ex. 3 | Ex. 4 | Ex. 5 | Ex. 6 |
|---|---|---|---|---|---|---|
| Composition of pressure-sensitive adhesive (part (s) by mass) | | | | | | |
| Acrylic diblock copolymer | | | | | | |
| (I-1) | 58.4 | | | | | |
| (I-2) | | 33.5 | | | | |
| (I-3) | | | 47.8 | | | |
| (I-4) | | | | 46.2 | 46.3 | |
| (I-5) | | | | | | 58.9 |
| Acrylic triblock copolymer | | | | | | |
| (II-1) | 41.6 | 66.5 | 52.2 | 53.8 | | |
| (II-2) | | | | | 53.7 | 41.1 |
| (II-3) | | | | | | |
| (II-4) | | | | | | |
| (X)/(Y) [1] | 35.9/64.1 | 39.6/60.4 | 44.4/55.6 | 39.8/60.2 | 39.7/60.3 | 36.0/64.0 |
| Pressure-sensitive adhesion properties | | | | | | |
| Thickness of pressure-sensitive adhesive layer (μm) | 25 | 25 | 25 | 25 | 25 | 25 |
| Appearance of pressure-sensitive adhesive layer of coated film | | | | | | |
| Transparency | compatible | compatible | compatible | compatible | compatible | compatible |
| Creep test | | | | | | |
| Weight drop time (or shift distance) | 0.05 mm shift after 1000 min (no dropping) | 0.04 mm shift after 1000 min (no dropping) | 0.00 mm shift after 1000 min (no dropping) | 0.00 mm shift after 1000 min (no dropping) | 0.00 mm shift after 1000 min (no dropping) | 0.04 mm shift after 1000 min (no dropping) |
| Adhesive force (N/25 mm) Storage conditions: 23° C., 24 hrs | | | | | | |
| Peel rate: 30 mm/min (a) | 0.40 | 0.15 | 0.08 | 0.06 | 0.05 | 0.84 |
| 300 mm/min (A) | 0.58 | 0.17 | 0.10 | 0.09 | 0.12 | 1.45 |
| Storage conditions: 90° C., 24 hrs | | | | | | |
| Peel rate: 30 mm/min (b) | 9.29 | 1.02 | 1.52 | 1.24 | 1.30 | 17.20 |
| 300 mm/min (B) | 12.38 | 0.88 | 0.88 | 1.35 | 1.65 | 15.70 |
| Adhesive force change ratio [2] | | | | | | |
| Peel rate: 30 mm/min (b)/(a) | 2221% | 583% | 1927% | 1967% | 2500% | 1960% |
| 300 mm/min (B)/(A) | 2024% | 418% | 780% | 1400% | 1275% | 983% |
| Tack test | | | | | | |
| Storage conditions: 23° C., 24 hrs | | | | | | |
| Distance moved [3] | 2.7 | 4.0 | 19.0 | 7.1 | 8.5 | 0.3 |

TABLE 2-continued

|  | Comp. Ex. 1 | Comp. Ex. 2 | Comp. Ex. 3 | Comp. Ex. 4 | Comp. Ex. 5 |
|---|---|---|---|---|---|
| Composition of pressure-sensitive adhesive (part(s) by mass) | | | | | |
| Acrylic diblock copolymer | | | | | |
| (I-1) | | | | | |
| (I-2) | | | | | |
| (I-3) | | | | | |
| (I-4) | | | 50.7 | 72.1 | 85.5 |
| (I-5) | | | | | |
| Acrylic triblock copolymer | | | | | |
| (II-1) | | | | 27.9 | |
| (II-2) | 100 | | | | 14.5 |
| (II-3) | | 100 | | | |
| (II-4) | | | 49.3 | | |
| (X)/(Y) [1] | 16.1/83.9 | 36.0/64.0 | 35.6/64.4 | 40.3/59.7 | 40.3/59.7 |
| Pressure-sensitive adhesion properties | | | | | |
| Thickness of pressure-sensitive adhesive layer (μm) | 25 | 25 | 25 | 25 | 25 |
| Appearance of pressure-sensitive adhesive layer of coated film | | | | | |
| Transparency | — | — | compatible | compatible | incompatible |
| Creep test | | | | | |
| Weight drop time (or shift distance) | 0.30 mm shift after 1000 min (no dropping) | 0.15 mm shift after 1000 min (no dropping) | 0.15 mm shift after 1000 min (no dropping) | 0.20 mm shift after 1000 min (no dropping) | immeasurable because of incompatibility |
| Adhesive force (N/25 mm) Storage conditions: 23° C., 24 hrs | | | | | |
| Peel rate: 30 mm/min (a) | 16.22 | 10.96 | 18.60 | 17.89 | immeasurable because of incompatibility |
| 300 mm/min (A) | 18.24 | 7.92 | 19.88 | 18.23 | |
| Storage conditions: 90° C., 24 hrs | | | | | |
| Peel rate: 30 mm/min (b) | 14.12 | 1.48 | 16.57 | 14.23 | immeasurable because of incompatibility |
| 300 mm/min (B) | 15.26 | 4.03 | 16.78 | 16.34 | |
| Adhesive force change ratio [2] | | | | | |
| Peel rate: 30 mm/min (b)/(a) | −13% | −87% | −11% | −20% | |
| 300 mm/min (B)/(A) | −16% | −49% | −16% | −10% | |
| Tack test Storage conditions: 23° C., 24 hrs | | | | | |
| Distance moved [3] | 0.3 | 2.2 | 0.3 | 0.5 | immeasurable because of incompatibility |

[1] ratio of total mass (X) of polymer block A contained in acrylic diblock copolymer (I) and polymer block C1 and polymer block C2 contained in acrylic triblock copolymer (II) to total mass (Y) of polymer block B contained in acrylic diblock copolymer (I) and polymer block D contained in acrylic triblock copolymer
[2] {(180° peel strength after 24 hours at 90° C.) − (180° peel strength after 24 hours at 23° C.)} ÷ (180° peel strength after 24 hours at 23° C.) × 100 [%]
[3] distance [cm] moved by ball (No. 3) defined by JIS Z0237 on horizontal plane after rolling of the ball on slope having inclination angle of 5° and length of 7.5 cm and dropping from the slope « Example 7 »

(1) 46.3 Parts by mass of the acrylic diblock copolymer (I-3) and 53.7 parts by mass of the acrylic triblock copolymer (II-2) prepared in Synthesis Example 3 and Synthesis Example 7, respectively, were weighed out as shown in Table 3, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50

μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 3, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 3.

《 Example 8 》

(1) 27.0 Parts by mass of the acrylic diblock copolymer (I-2) and 73.0 parts by mass of the acrylic triblock copolymer (II-1) prepared in Synthesis Example 2 and Synthesis Example 6, respectively, were weighed out as shown in Table 3, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 3, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 3.

《 Example 9 》

(1) 25.0 Parts by mass of the acrylic diblock copolymer (I-2) and 75.0 parts by mass of the acrylic triblock copolymer (II-1) prepared in Synthesis Example 2 and Synthesis Example 6, respectively, were weighed out as shown in Table 3, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 3, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 3.

《 Comparative Example 6 》

(1) 15.0 Parts by mass of the acrylic diblock copolymer (I-2) and 85.0 parts by mass of the acrylic triblock copolymer (II-1) prepared in Synthesis Example 2 and Synthesis Example 5, respectively, were weighed out as shown in Table 3, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers. Further, from the solution type pressure-sensitive adhesive, the solvent was removed, whereby a pressure-sensitive adhesive composition was obtained.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 3, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 3.

《 Comparative Example 7 》

(1) 40.0 Parts by mass of the acrylic diblock copolymer (I-5) and 60.0 parts by mass of the acrylic triblock copolymer (II-2) prepared in Synthesis Example 5 and Synthesis Example 7, respectively, were weighed out as shown in Table 3, and a pressure-sensitive adhesive composition was prepared. Thereafter, the pressure-sensitive adhesive composition was diluted with toluene so that the total solids content might become 35% by mass, and then shaken to prepare a solution type pressure-sensitive adhesive. The resulting solution type pressure-sensitive adhesive had transparent appearance and did not suffer turbidity and separation into two layers.

(2) The solution type pressure-sensitive adhesive obtained in the above (1) was applied onto a PET film (thickness: 50 μm) by means of a bar coater and then dried at 60° C. for 30 minutes to produce a pressure-sensitive adhesion type optical film consisting of pressure-sensitive adhesive layer/PET film. The thickness of the pressure-sensitive adhesive layer in the pressure-sensitive adhesion type optical film is as shown in Table 3, and the pressure-sensitive adhesive layer was transparent.

(3) With regard to the pressure-sensitive adhesion type optical film obtained in the above (2), adhesive strength (peel strength) to a glass plate and the results of creep test and tack test are set forth in Table 3.

TABLE 3

|  | Ex. 7 | Ex. 8 | Ex. 9 | Comp. Ex. 6 | Comp. Ex. 7 |
|---|---|---|---|---|---|
| Composition of pressure-sensitive adhesive (part(s) by mass) Acrylic diblock copolymer | | | | | |
| (I-1) | | | | | |
| (I-2) | | 27.0 | 25.0 | 15.0 | |
| (I-3) | 46.3 | | | | |
| (I-4) | | | | | |
| (I-5) | | | | | 40.0 |
| Acrylic triblock copolymer | | | | | |
| (II-1) | | 73.0 | 75.0 | 85.0 | |
| (II-2) | 53.7 | | | | |
| (II-3) | | | | | |
| (II-4) | | | | | 60.0 |
| (X)/(Y)[1] | 39.9/60.1 | 32.2/67.8 | 31.0/69.0 | 25.1/74.9 | 12.3/87.7 |
| Pressure-sensitive adhesion properties | | | | | |
| Thickness of pressure-sensitive adhesive layer (μm) | 25 | 25 | 25 | 25 | 25 |
| Appearance of pressure-sensitive adhesive layer of coated film | | | | | |
| Transparency | compatible | compatible | compatible | compatible | compatible |
| Creep test | | | | | |
| Weight drop time (or shift distance) | 0.00 mm shift after 1000 min (no dropping) | 0.20 mm shift after 1000 min (no dropping) | dropping after 437 min | 0.46 mm shift after 1000 min (no dropping) | dropping after 101 min |
| Adhesive force (N/25 mm) Storage conditions: 23° C., 24 hrs | | | | | |
| Peel rate: 300 mm/min (A) | 0.43 | 11.50 | 14.54 | 21.20 | 13.55 |
| Storage conditions: 90° C., 24 hrs | | | | | |
| Peel rate: 300 mm/min (B) | 0.74 | not less than 30 | 18.35 | 14.80 | 14.90 |
| Adhesive force change ratio[2] | | | | | |
| Peel rate: 300 mm/min (B)/(A) | 74% | not less than 160% | 26% | −30% | 10% |
| Tack test Storage conditions: 23° C., 24 hrs | | | | | |
| Distance moved[3] | 10.2 | 2.7 | 2.5 | 0.5 | 0.5 |

[1] ratio of total mass (X) of polymer block A contained in acrylic diblock copolymer (I) and polymer block C1 and polymer block C2 contained in acrylic triblock copolymer (II) to total mass (Y) of polymer block B contained in acrylic diblock copolymer (I) and polymer block D contained in acrylic triblock copolymer
[2] {(180° peel strength after 24 hours at 90° C.) − (180° peel strength after 24 hours at 23° C.)} ÷ (180° peel strength after 24 hours at 23° C.) × 100 [%]
[3] distance [cm] moved by ball (No. 3) defined by JIS Z0237 on horizontal plane after rolling of the ball on slope having inclination angle of 5° and length of 7.5 cm and dropping from the slope From the results of Table 2 and Table 3, it can be seen that as compared with the pressure-sensitive adhesion type optical films of Comparative Example 1 and Comparative Example 2 produced by the use of the pressure-sensitive adhesive compositions each being composed of only the acrylic triblock copolymer, the pressure-sensitive adhesion type optical films produced by the use of the pressure-sensitive adhesive compositions of Examples 1 to 8 containing the acrylic diblock copolymers (I) [acrylic diblock copolymers (I-1) to (I-4)] and the acrylic triblock copolymers (II) [acrylic triblock copolymers (II-1) and (II-2)] in amounts of the ranges defined by the present invention exhibited low adhesive strength before heat treatment, that is, adhesive strength suitable for reworking and could be peeled off with proper peel strength without bringing about adhesive transfer, but after heat treatment they were firmly bonded by virtue of rise of adhesive strength, and besides, they exhibited excellent durability in the creep test.

As for the pressure-sensitive adhesion type optical film of Comparative Example 3 produced by the use of the acrylic triblock copolymer (II-4) in which the content of the polymer block D in the acrylic triblock copolymer (II) was less than the lower limit of the range defined by the present invention, the adhesive strength change ratio did not rise after heating, and the properties that durability is enhanced under the high-temperature conditions for a long time could not be imparted. As for the pressure-sensitive adhesion type optical film of Comparative Example 7 produced by the use of the acrylic diblock copolymer (I-5) in which the content of the polymer block B in the acrylic diblock copolymer (I) was more than the upper limit of the range defined by the present invention, the initial adhesive strength was a little high, and the durability in the creep test was poor.

As for also the pressure-sensitive adhesion type optical film of Comparative Example 4 produced by the use of the pressure-sensitive adhesive composition in which the amount of the acrylic diblock copolymer (I) is larger than the upper limit of the range defined by the present invention in terms of a mass ratio (I)/(II) of the acrylic diblock copolymer (I) to the acrylic triblock copolymer (II), the adhesive strength change ratio did not rise after heating, and the properties that durability is enhanced under the high-temperature conditions for a long time could not be imparted, similarly to the above.

As for the pressure-sensitive adhesion type optical film of Comparative Example 5 produced by the use of the pressure-sensitive adhesive composition in which the amount of the acrylic diblock copolymer (I) was much larger than the upper limit of the range defined by the present invention in terms of a mass ratio (I)/(II) of the acrylic diblock copolymer (I) to the acrylic triblock copolymer (II), compatibility of the acrylic diblock copolymer (I-4) with the acrylic triblock copolymer (II-2) was low, and in the case where a solution type pressure-sensitive adhesive was prepared from the pressure-sensitive adhesive composition, the pressure-sensitive adhesive had turbid appearance, and when the pressure-sensitive adhesive was allowed to stand still, it suffered separation into two layers, so that homogenous coating with this pressure-sensitive adhesive was impossible. Moreover, the pressure-sensitive adhesive layer of the pressure-sensitive adhesion type optical film underwent macrophase separation and was opaque, and the transparency of the pressure-sensitive adhesion type optical film was lowered.

As for the pressure-sensitive adhesion type optical film of Comparative Example 6 produced by the use of the pressure-sensitive adhesive composition in which the amount of the acrylic diblock copolymer (I) was smaller than the lower limit of the range defined by the present invention in terms of a mass ratio (I)/(II) of the acrylic diblock copolymer (I) to the acrylic triblock copolymer (II), the initial adhesive strength was high, and the reworkability was poor. Also in the creep test, shift was relatively large, and the result was inferior to that of the examples.

In comparison between Example 1 and Example 6 or between Example 2, Example 4 and Example 5, which were equivalent in the mass ratio (I)/(II) of the acrylic diblock copolymer (I) to the acrylic triblock copolymer (II) because the structure of the acrylic diblock copolymer (I) was controlled, they exhibited various distances passed by ball in the rolling ball tack test. Therefore, it can be said that the tack can be controlled by optimizing the structure of the acrylic diblock copolymer (I) or by properly adding a tackifying resin according to the tack required for the use of a pressure-sensitive adhesion type optical film or a protective film for pressure-sensitive adhesion type optical films.

INDUSTRIAL APPLICABILITY

The present invention provides a non-chemical crosslinking type pressure-sensitive adhesive composition for optical films, which contains an acrylic diblock copolymer (I) and a specific acrylic triblock copolymer (II). This pressure-sensitive adhesive composition can adhere with 180° peel strength suitable for reworking in the initial stage, and when reworking is performed, peeling with proper peel strength is possible without bringing about adhesive transfer. Further, when the pressure-sensitive adhesive composition is kept in the adhering state over a long period of time after adhesion or especially when the pressure-sensitive adhesive composition in the adhering state is exposed to high temperatures or moist heat, the pressure-sensitive adhesive composition exhibits excellent durability by virtue of rise of 180° peel strength. Therefore, the pressure-sensitive adhesive composition can be efficiently used for producing pressure-sensitive adhesion type optical films and protective films for optical films.

The invention claimed is:

1. A pressure-sensitive adhesive composition, comprising:
(I) an acrylic diblock copolymer of formula (1):

$$A\text{-}B \qquad (1),$$

wherein:
A is a methacrylic acid alkyl ester polymer block; and
B is an acrylic acid alkyl ester polymer block,
wherein the content of the polymer block B is 10 to 55% by mass, based on a total mass of the acrylic diblock copolymer (I), and
wherein the acrylic diblock copolymer (I) has a weight-average molecular weight (Mw) in a range from 9,000 to 300,000, and a molecular weight distribution (Mw/Mn) in a range from 1.0 to 1.5; and
(II) an acrylic triblock copolymer of formula (2):

$$C1\text{-}D\text{-}C2 \qquad (2),$$

wherein:
C1 and C2 are each independently a methacrylic acid alkyl ester polymer block having a glass transition temperature of not lower than 100° C.; and
D is an acrylic acid alkyl ester polymer block having a glass transition temperature of not higher than −20° C.,
wherein the content of the polymer block D is 82 to 95% by mass, based on a total mass of the acrylic triblock copolymer (II), and
wherein the acrylic triblock copolymer (I) has a weight-average molecular weight (Mw) in a range from 50,000 to 300,000, and a molecular weight distribution (Mw/Mn) in a range from 1.0 to 1.5,
wherein a mass ratio of the acrylic diblock copolymer (I) to the acrylic triblock copolymer (II), (I)/(II), is in the range of 70/30 to 41/59.

2. The pressure-sensitive adhesive composition of claim 1, wherein the mass ratio of the acrylic diblock copolymer (I) to the acrylic triblock copolymer (II), (I)/(II), is in the range of 60/40 to 45/55.

3. The pressure-sensitive adhesive composition of claim 1, wherein the content of the polymer block B in the acrylic diblock copolymer (I) is 10 to 49% by mass.

4. A pressure-sensitive adhesion optical film, comprising a pressure-sensitive adhesive layer comprising the pressure-sensitive adhesive composition of claim 1.

5. A protective film, comprising a pressure-sensitive adhesive layer comprising the pressure-sensitive adhesive composition of claim 1.

6. The pressure-sensitive adhesion optical film of claim 4, wherein a ratio of change in adhesive strength of the pressure-sensitive adhesion optical film to an adherend, as calculated from formula (3), is not less than 200%:

$$[(180° \text{ peel strength after 24 hours at } 90° \text{ C.})-\\(180° \text{ peel strength after 24 hours at } 23° \text{ C.})] \div \\(180° \text{ peel strength after 24 hours at } 23° \text{ C.}) \times \\100\, [\%] \qquad (3).$$

7. The protective film of claim 5, wherein a ratio of change in adhesive strength of the protective film to an adherend, as calculated from formula (3), is not less than 200%:

$$[(180° \text{ peel strength after 24 hours at } 90° \text{ C.})-\\(180° \text{ peel strength after 24 hours at } 23° \text{ C.})] \div \\(180° \text{ peel strength after 24 hours at } 23° \text{ C.}) \times \\100\, [\%] \qquad (3).$$

8. An image display device, comprising the pressure-sensitive adhesion optical film of claim 4.

9. An image display device, comprising the protective film of claim 5.

10. The pressure-sensitive adhesive composition of claim 1, wherein the content of the polymer block B in the acrylic diblock copolymer (I) is 18 to 35% by mass.

11. The pressure-sensitive adhesive composition of claim 1, wherein the weight-average molecular weight of the acrylic diblock copolymer (I) is in a range from 18,000 to 200,000.

12. The pressure-sensitive adhesive composition of claim 1, wherein the weight-average molecular weight of the acrylic diblock copolymer (I) is in a range from 30,000 to 150,000.

13. The pressure-sensitive adhesive composition of claim 1, wherein the molecular weight distribution (Mw/Mn) of the acrylic diblock copolymer (I) is in a range from 1.0 to 1.4.

14. The pressure-sensitive adhesive composition of claim 1, wherein the molecular weight distribution (Mw/Mn) of the acrylic diblock copolymer (I) is in a range from 1.0 to 1.3.

15. The pressure-sensitive adhesive composition of claim 1, wherein the content of the polymer block D in the acrylic triblock copolymer (II) is 82 to 90% by mass.

16. The pressure-sensitive adhesive composition of claim 1, wherein the weight-average molecular weight of the acrylic triblock copolymer (II) is in a range from 70,000 to 250,000.

17. The pressure-sensitive adhesive composition of claim 1, wherein the molecular weight distribution (Mw/Mn) of the acrylic triblock copolymer (II) is in a range from 1.0 to 1.4.

\* \* \* \* \*